United States Patent
Tian et al.

(10) Patent No.: US 11,683,805 B2
(45) Date of Patent: Jun. 20, 2023

(54) RESOURCE SELECTION FOR COMMUNICATING UPLINK CONTROL INFORMATION

(71) Applicant: QUALCOMM Incorporated, San Diego, CA (US)

(72) Inventors: Qingjiang Tian, San Diego, CA (US); Jing Sun, San Diego, CA (US); Zhifei Fan, San Diego, CA (US); Wooseok Nam, San Diego, CA (US); Ahmed Abdelaziz Ibrahim Abdelaziz Zewail, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 17/180,305

(22) Filed: Feb. 19, 2021

(65) Prior Publication Data
US 2022/0272690 A1    Aug. 25, 2022

(51) Int. Cl.
*H04W 72/04* (2023.01)
*H04W 72/21* (2023.01)
*H04L 27/26* (2006.01)
*H04J 13/00* (2011.01)
*H04L 5/00* (2006.01)

(52) U.S. Cl.
CPC ......... *H04W 72/21* (2023.01); *H04J 13/0074* (2013.01); *H04L 5/0039* (2013.01); *H04L 27/2607* (2013.01)

(58) Field of Classification Search
CPC .. H04W 72/21; H04L 27/2607; H04L 5/0039; H04L 5/0053; H04L 27/2603; H04L 27/2614; H04B 1/69; H04B 2001/6904; H04J 13/0062; H04J 13/0074
See application file for complete search history.

(56) References Cited

FOREIGN PATENT DOCUMENTS

WO    WO-2020028868 A1 *   2/2020   .............. H04B 1/69

OTHER PUBLICATIONS

Ericsson: "Feature Lead Summary 3 for UL Signals and Channels", 3GPP Draft, 3GPP TSG-RAN WG1 Meeting #98b, R1-1911674 Feature Lead Summary 3 for 7.2.2.1.3 UL Signals and Channels, 3rd Generation Partnership Project (3GPP), Mobile Competence Centre, 650, Route Des Lucioles, F-06921 Sophia-Anti, vol. RAN WG1, No. Chongqing, China, Aug. 14, 2019-Aug. 20, 2019 Oct. 22, 2019 (Oct. 22, 2019), XP051798916, pp. 1-29.
(Continued)

*Primary Examiner* — Vinncelas Louis
(74) *Attorney, Agent, or Firm* — Loza & Loza LLP/Qualcomm Incorporated

(57) ABSTRACT

Resource selection for communication of uplink control information may include determining cyclic shift ramping for resource block (RB) sets. A user equipment UE) may use one or more RB sets for transmitting uplink control information on a shared radio frequency spectrum such as an unlicensed band. In some examples, the UE may transmit uplink control information to a base station (BS) via consecutive RB sets. To this end, the BS may schedule consecutive RB sets for an uplink transmission by the wireless communication device and monitor each of these RB sets for uplink control information.

30 Claims, 16 Drawing Sheets

(56) References Cited

OTHER PUBLICATIONS

Interdigital Inc: "On UL Signals and Channels in NR-Unlicensed", 3GPP Draft, 3GPP TSG RAN WG1 Meeting #93, R1-1807035 On UL Signals and Channels in NR-Unlicensed, 3rd Generation Partnership Project (3GPP), Mobile Competence Centre, 650, Route Des Lucioles, F-06921 Sophia-Antipolis Cedex, Fra, vol. RAN WG1, No. Busan, Korea, May 21, 2018-May 25, 2018 May 12, 2018 (2018-05-12), XP051462861, 19 Pages.
International Search Report and Written Opinion—PCT/US2022/012454—ISA/EPO—dated Apr. 8, 2022.
Qualcomm Incorporated: "UL Signals and Channels for NR-U", 3GPP Draft, 3GPP TSG RAN WG1 Meeting #99, R1-1912937, 3rd Generation Partnership Project (3GPP), Mobile Competence Centre, 650, Route Des Lucioles, F-06921 Sophia-Antipolis Cedex, France, vol. RAN WG1. No. Reno, Nevada, US, Nov. 18, 2019-Nov. 22, 2019, Nov. 9, 2019 (Nov. 9, 2019), XP051823700, pp. 1-24, R1-1912937 7.2.2.1.3 UL signals and channels for NR-U.docx [retrieved on Nov. 9, 2019] paragraph [03.4] figure 2, p. 8, line 1-line 12, p. 10, paragraph 3.1-p. 14, paragraph 3.4, p. 16. paragraph 3.6.

* cited by examiner

RESOURCE SELECTION FOR COMMUNICATING UPLINK CONTROL INFORMATION

INTRODUCTION

The technology discussed below relates generally to wireless communication and, more particularly but not exclusively, to selecting resources for communication of uplink control information.

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

A BS may schedule access to a cell to support access by multiple UEs. For example, a BS may allocate different resources (e.g., time domain and frequency domain resources) for different UEs operating within a cell of the BS.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment is disclosed. The method may include identifying a plurality of resource block (RB) sets allocated for transmission of uplink control information. Each RB set of the plurality of RB sets may include a plurality of contiguous resource blocks (RBs). The method may also include determining cyclic shift ramping to be applied to successive RB sets of the plurality of RB sets, and transmitting the uplink control information via the plurality of RB sets according to the cyclic shift ramping.

In some examples, a user equipment may include a transceiver, a memory, and a processor coupled to the transceiver and the memory. The processor and the memory may be configured to identify a plurality of resource block (RB) sets allocated for transmission of uplink control information. Each RB set of the plurality of RB sets may include a plurality of contiguous resource blocks (RBs). The processor and the memory may also be configured to determine cyclic shift ramping to be applied to successive RB sets of the plurality of RB sets, and transmit via the transceiver the uplink control information via the plurality of RB sets according to the cyclic shift ramping.

In some examples, a user equipment may include means for identifying a plurality of resource block (RB) sets allocated for transmission of uplink control information. Each RB set of the plurality of RB sets may include a plurality of contiguous resource blocks (RBs). The user equipment may also include means for determining cyclic shift ramping to be applied to successive RB sets of the plurality of RB sets, and means for transmitting the uplink control information via the plurality of RB sets according to the cyclic shift ramping.

In some examples, an article of manufacture for use by a user equipment includes a computer-readable medium having stored therein instructions executable by one or more processors of the user equipment to identify a plurality of resource block (RB) sets allocated for transmission of uplink control information. Each RB set of the plurality of RB sets may include a plurality of contiguous resource blocks (RBs). The computer-readable medium may also have stored therein instructions executable by one or more processors of the user equipment to determine cyclic shift ramping to be applied to successive RB sets of the plurality of RB sets, and transmit the uplink control information via the plurality of RB sets according to the cyclic shift ramping.

One or more of the following features may be applicable to one or more of the method, the apparatuses, and the computer-readable medium of the preceding paragraphs. Determining the cyclic shift ramping may include determining a first cyclic shift set to be applied to a first set of contiguous RBs of a first RB set of the plurality of RB sets and determining a second cyclic shift set to be applied to a second set of contiguous RBs of a second RB set of the plurality of RB sets. Transmitting the uplink control information via the plurality of RB sets according to the cyclic shift ramping may include transmitting the first RB set according to the first cyclic shift set and transmitting the second RB set according to the second cyclic shift set. Determining the first cyclic shift set may include calculating a first cyclic shift value based on a first RB set index of the first RB set. Determining the second cyclic shift set may include calculating a second cyclic shift value based on a second RB set index of the second RB set. A step size of the first cyclic shift set may be coprime with a length of resource elements (REs) in an RB of the first RB set. First information for a first RB set of the plurality of RB sets may be generated using a first root sequence. Second information for a second RB set of the plurality of RB sets may be generated using a second root sequence that is different from the first root sequence.

In some examples, a method for wireless communication at a base station may include generating an indication of a plurality of resource block (RB) sets allocated for transmission of uplink control information. Each RB set of the plurality of RB sets may include a plurality of contiguous resource blocks (RBs). The method may also include transmitting the indication to a user equipment, and receiving the uplink control information from the user equipment according to cyclic shift ramping applied to successive RB sets of the plurality of RB sets.

In some examples, a base station may include a transceiver, a memory, and a processor communicatively coupled to the transceiver and the memory. The processor and the memory may be configured to generate an indication of a plurality of resource block (RB) sets allocated for transmission of uplink control information. Each RB set of the plurality of RB sets may include a plurality of contiguous resource blocks (RBs). The processor and the memory may also be configured to transmit the indication to a user equipment, and receive the uplink control information from the user equipment via the transceiver according to cyclic shift ramping applied to successive RB sets of the plurality of RB sets.

In some examples, a base station may include means for generating an indication of a plurality of resource block (RB) sets allocated for transmission of uplink control information. Each RB set of the plurality of RB sets may include a plurality of contiguous resource blocks (RBs). The base station may also include means for transmitting the indication to a user equipment, and means for receiving the uplink control information from the user equipment according to cyclic shift ramping applied to successive RB sets of the plurality of RB sets.

In some examples, an article of manufacture for use by a base station includes a computer-readable medium having stored therein instructions executable by one or more processors of the base station to generate an indication of a plurality of resource block (RB) sets allocated for transmission of uplink control information. Each RB set of the plurality of RB sets may include a plurality of contiguous resource blocks (RBs). The computer-readable medium may also have stored therein instructions executable by one or more processors of the base station to transmit the indication to a user equipment, and receive the uplink control information from the user equipment according to cyclic shift ramping applied to successive RB sets of the plurality of RB sets.

One or more of the following features may be applicable to one or more of the method, the apparatuses, and the computer-readable medium of the preceding paragraphs. The cyclic shift ramping may include a first cyclic shift set applied to a first set of contiguous RBs of a first RB set of the plurality of RB sets and a second cyclic shift set applied to a second set of contiguous RBs of a second RB set of the plurality of RB sets. Receiving the uplink control information via the plurality of RB sets according to the cyclic shift ramping may include receiving the first RB set according to the first cyclic shift set and receiving the second RB set according to the second cyclic shift set. The first cyclic shift set may be based on a first RB set index of the first RB set. The second cyclic shift set may be based on a second RB set index of the second RB set. A step size of the first cyclic shift set may be coprime with a length of resource elements (REs) in an RB of the first RB set. Receiving the uplink control information may include receiving first information for a first RB set of the plurality of RB sets based on a first root sequence and receiving second information for a second RB set of the plurality of RB sets based on a second root sequence that is different from the first root sequence.

These and other aspects of the disclosure will become more fully understood upon a review of the detailed description, which follows. Other aspects and features of the present disclosure will become apparent to those of ordinary skill in the art, upon reviewing the following description of specific examples of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while examples may be discussed below as device, system, or method examples it should be understood that such examples can be implemented in various devices, systems, and methods.

DETAILED DESCRIPTION

Figure 1:
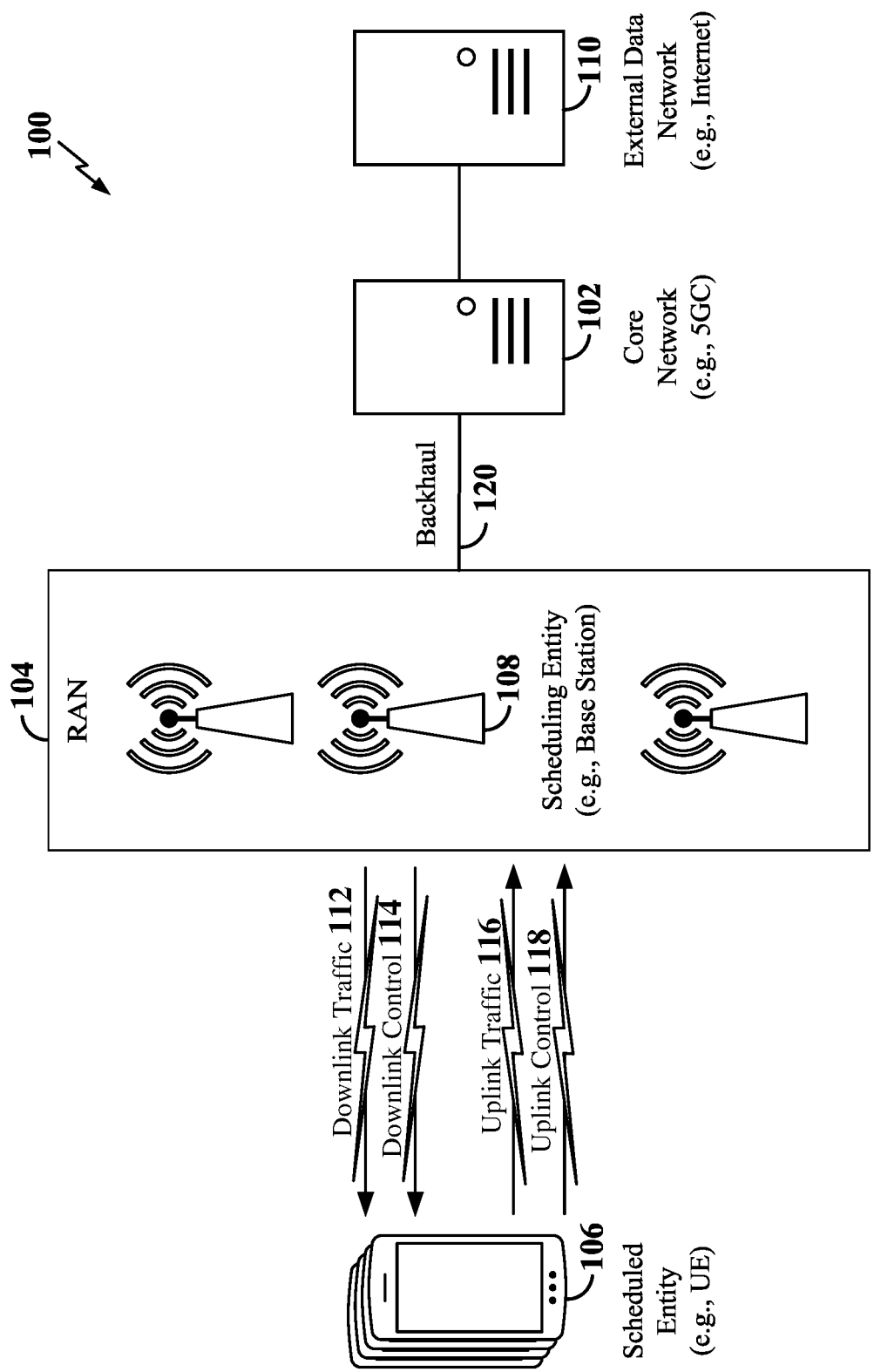
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Additionally, well-known elements will not be described in detail or will be omitted so as not to obscure the relevant details of the disclosure.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to resource selection for communication of uplink control information. A user equipment UE) may use one or more resource block (RB) sets for transmitting uplink control information on a shared radio frequency spectrum such as an unlicensed band. In some examples, the UE may transmit uplink control information to a base station (BS) via consecutive RB sets. To this end, the BS may schedule consecutive RB sets for an uplink transmission by the wireless communication device and monitor each of these RB sets for uplink control information.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a scheduling entity (described further below; e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
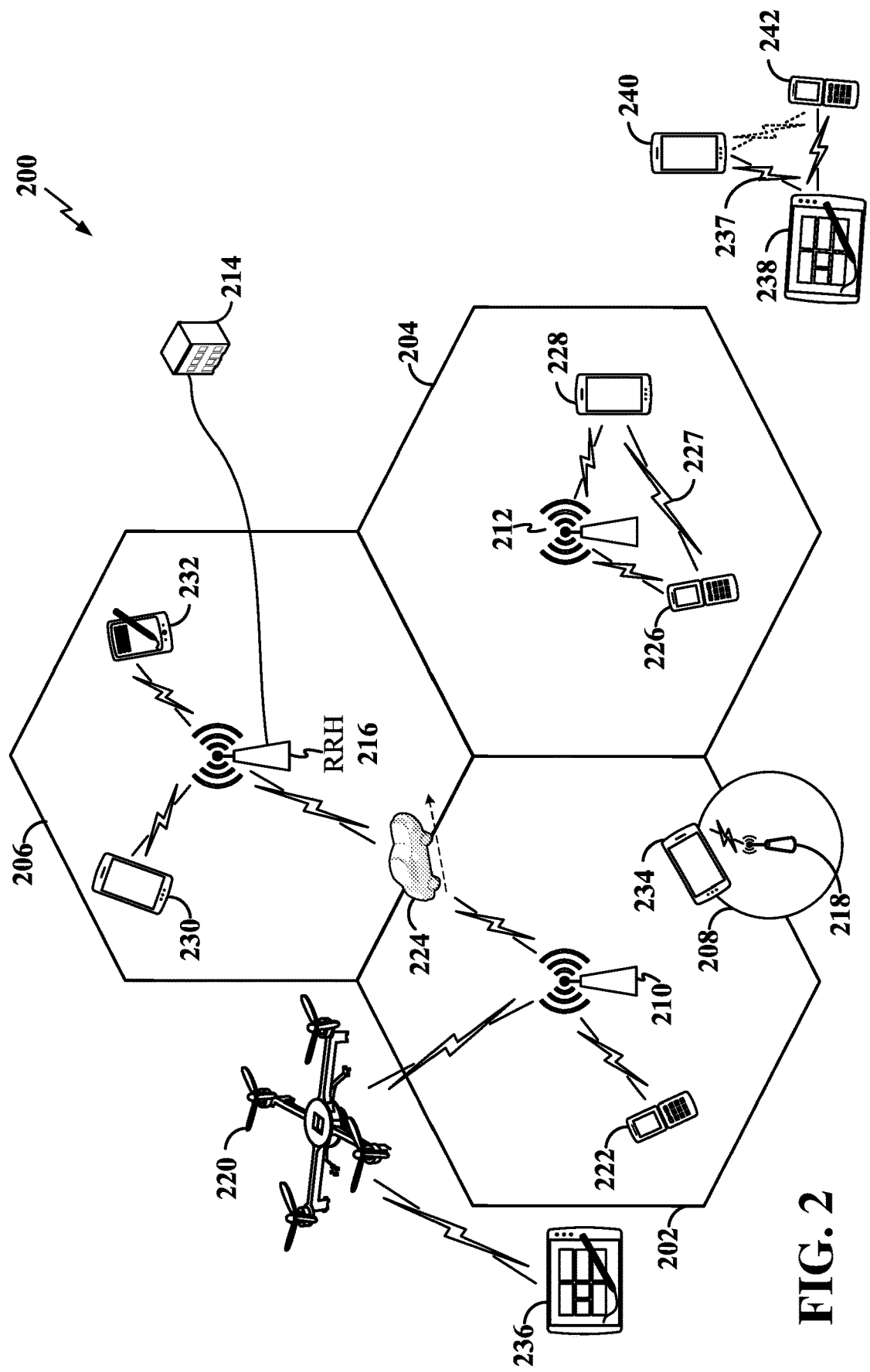
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving the UE 236). That is, in some examples, a cell may not necessarily be stationary, and the geographic area of the cell may move according to the location of a mobile base station such as a UAV 220.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network. In some examples, the sidelink signals 227 and 237 include sidelink traffic (e.g., a physical sidelink shared channel) and sidelink control (e.g., a physical sidelink control channel).

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
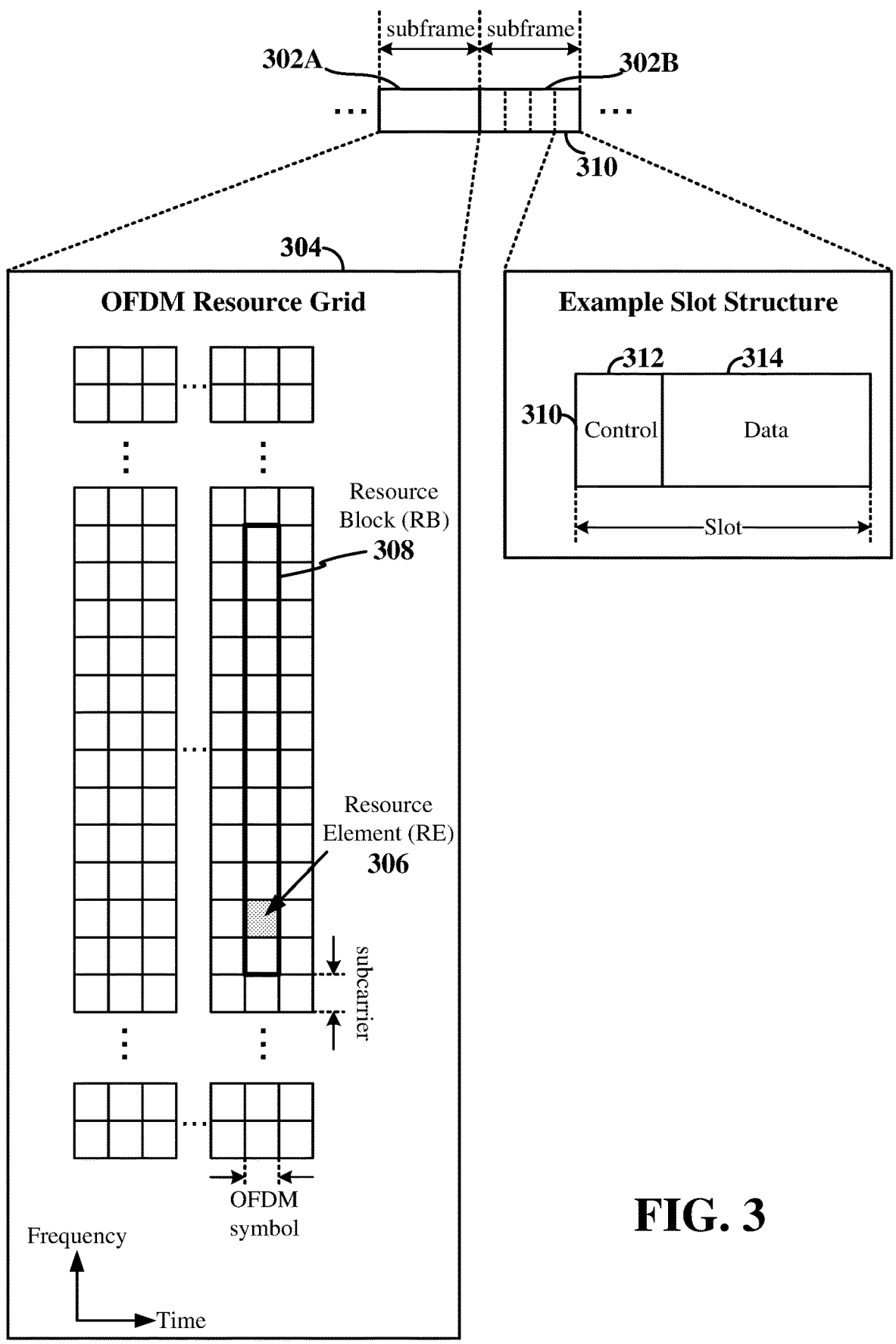
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302A is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 13 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The simple structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

As the SI may change over time, the scheduling entity may send paging messages that indicate a change in the SI. Accordingly, a UE may periodically monitor a paging channel for these and other paging messages. If a paging message indicates that the SI has changed, the UE monitors a broadcast channel or some other designated channel for the new SI.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., an Rx V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

As discussed above, a network may use unlicensed radio frequency (RF) spectrum in some scenarios. For example, a network operator may deploy cells that are configured to communicate on an unlicensed RF spectrum (e.g., in addition to cells operating on a licensed RF spectrum) to extend the coverage of the network or to provide additional services (e.g., higher throughput) to UEs operating within the network.

In some scenarios, devices that transmit over unlicensed RF spectrum may use a collision avoidance scheme to reduce the possibility that multiple devices will transmit on the same band at the same time. One example of such a collision avoidance scheme is a listen-before-talk (LBT) procedure. In general, before a first device transmits on a resource, the first device may listen for transmissions by another device. If the resource is currently being used, the first device may back-off for a period of time and then re-attempt transmission (e.g., by listening for other transmissions again). The first device could also select a different resource in the unlicensed band. If the resource is free, the first device may reserve the resource for a subsequent communication. Carrier sense multiple access (CSMA) is one example of an LBT procedure. Other types of LBT procedures may be used as well.

NR operation in the unlicensed RF spectrum may be referred to as NR-U. Under NR-U, some transmissions may be subject to LBT. Thus, a wireless device such as a UE or a gNB may perform a clear channel assessment (CCA) prior to gaining control of a wireless channel in an unlicensed band. For example, under NR-U, a gNB's scheduling of uplink and downlink transmissions may be subject to LBT.

A gNB may schedule uplink control information transmissions by utilizing different PUCCH formats (for example, PUCCH format 0, format 1, format 4, etc.) for UEs, specifying which time-domain and frequency-domain resources each PUCCH is to use for its respective uplink transmission. PUCCH format 0/1 may use different cyclic shifting of a base sequence to carry uplink control information and improve communication performance. In addition, for UL transmissions on an unlicensed RF spectrum, PRB-interlace-based scheduling may be used in the frequency domain. For example, in NR-U operated in FR1, an PRB interlaced waveform may be used in the UL to satisfy occupied channel bandwidth (OCB) goals and/or to boost UL transmit power for a given power spectral density (PSD) limitation.

In 3GPP Rel.15, the cyclic shift of the only PRB for PUCCH format 0 is defined as set forth in Equation 1:

$$\alpha_l = \frac{2\pi}{N_{SC}^{RB}}((m_0 + m_{CS} + n_{CS}(n_{S,f}^\mu, l + l')) \bmod N_{SC}^{RB}) \quad \text{EQUATION 1}$$

In 3GPP Rel.16, the cyclic shift $\alpha_l$ of an interlaced PRB for enhanced PUCCH (EPUCCH) format 0 in an FR1 unlicensed band is defined as set forth in Equation 2:

$$\alpha_l = \frac{2\pi}{N_{SC}^{RB}}((m_0 + m_{CS} + n_{CS}(n_{S,f}^\mu, l + l')) \bmod N_{SC}^{RB}) \quad \text{EQUATION 2}$$

Figure 4:
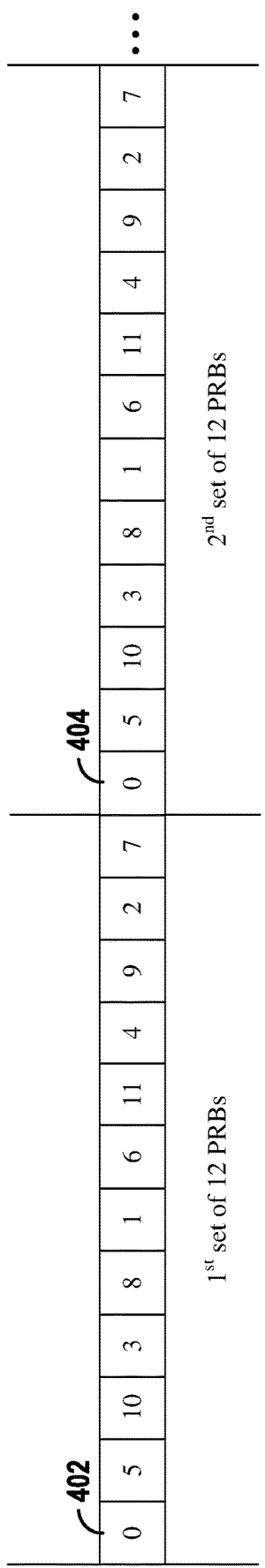
FIG. 4 is a conceptual illustration of an example of cyclic shift ramping for different RB sets according to some aspects.

Here $m_{int}$ controls the interlaced waveform cyclic shift ramping. For example, $m_{int}=5n_{IRB}^\mu$ provides a cyclic shift ramping of 5. The parameter $n_{IRB}^\mu$ is the PRB index within the interlace starting from the edge of the BWP. The first PRB of the interlace in the BWP is indexed as 0, and so on. Within 12 PRBs of an interlace, since 5 is co-prime with 12, the resulting cyclic shift will not repeat. Beyond 12 PRBs, there will be repetitions. Thus, the same cyclic shift may repeat every 12 PRBs in the interlace as shown in FIG. 4 for a first RB set 402 and a second RB set 404. In some aspects, this regularity may negatively impact the peak-to-average power ratio (PAPR).

Wireless communication operations in certain frequency bands may be subject to regulatory restrictions (e.g., a Federal Communications Commission (FCC) regulation). For unlicensed operation at higher frequency bands (e.g., 60 GHz and above), a PSD limit of 23 dBm/MHz with up to 40 dBm effective isotropic radiated power (EIRP) may be specified for certain scenarios. While one UE (e.g., mobile terminal) may have a transmit power (TRP) of approximately 23 dBm, another UE (e.g., a customer premises equipment (CPE)) may operate at higher EIRP (e.g., up to 40 dBm). To fully utilize the power for these higher EIRP capable devices, a transmission bandwidth of approximately 50 MHz may be needed to provide an EIRP of 40 dBm under the 23 dBm/MHz PSD limitation.

FR2 in the range of 52.6 GHz to 70 GHz may support a subcarrier spacing (SCS) of 120 kHz, 480 kHz, and 960 kHz in some examples. Using a 120 kHz SCS for PUCCH, the total occupied bandwidth would be 1.44 MHz for PUCCH formats 0/1/4 if legacy design in NR Release 15 is directly applied (which occupy 1 PRB in the frequency domain based on NR release 15 design). Using a 960 kHz SCS for PUCCH, the total occupied bandwidth is approximately 12 MHz for PUCCH formats 0/1/4 with one PRB occupation. Table 1 indicates, for each SCS of 120/480/960 kHz, the number of PRBs needed to provide an EIRP of 40 dBm under the 23 dBm/MHz PSD limitation.

TABLE 1

| SCS | Single PRB BW (MHz) | Number of full PRBs contained within 50 MHzBW |
|---|---|---|
| 120 kHz | 1.44 | 34 |
| 480 kHz | 5.76 | 8 |
| 960 kHz | 11.52 | 4 |

Thus, for a high capability UE, it is desirable to support multiple PRB PUCCH format 0/1/4 transmission to achieve the higher EIRP under such a PSD limitation. Due to the larger SCS in the higher frequency band (e.g., at least 120 KHz SCS), each PRB spans more than 1 MHz. Thus, there is no need for a PRB-interlace waveform as in Rel. 16 NR-U UL operated in sub-6 GHz where the transmit power per 1 MHz is collected in a PRB within the 1 MHz to achieve higher transmit power per PRB. For higher frequency bands, it is beneficial to aggregate contiguous PRBs to potentially achieve lower PAPR. With contiguous PRBs for PUCCH, frequency hopping can still be enabled.

A 120 kHz SCS is a strong candidate for FR2 in the range of 52.6 GHz to 70 GHz as it is already part of the current FR2 specification. For approximately 50 MHz transmission bandwidth, the number of PRBs used for PUCCH format 0/1 can be increased from 1 up to 34.

The disclosure relates in some aspect to extending the NR-U EPUCCH format 0 operated in FR1 concept for PUCCH format 0 in higher frequency bands (e.g., FR2). In some examples, different RB sets in the M PRBs use different cyclic shifts with a corresponding cyclic shift step size. In some examples, different cyclic shift step sizes may be selected based on a positive or negative SR.

Figure 5:
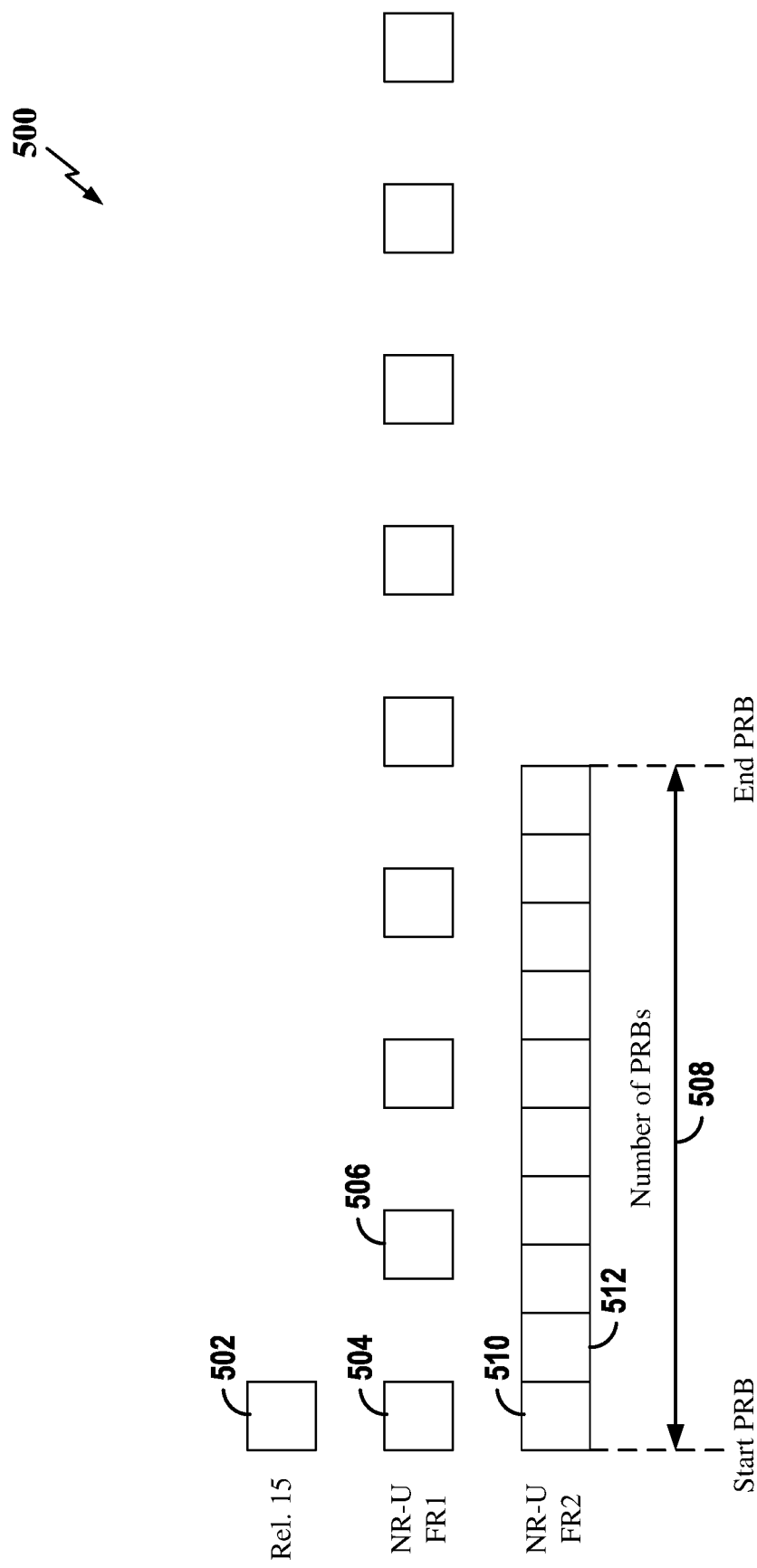
FIG. 5 is a conceptual illustration of examples of resource allocations according to some aspects.

FIG. 5 illustrates examples 500 of PUCCH format 0 in NR-U FR1 and EPUCCH format 0 in NR-U FR1 vs PUCCH format 0 in FR2 of the present disclosure. In 3GPP Rel. 15, a single PRB 502 is used for PUCCH format 0. In 3GPP Rel. 16, interlaced PRBs (e.g., PRB 504 and PRB 506) are used for PUCCH format 0 (referred to as EPUCCH format 0 above). According to the present disclosure, a set of contiguous PRBs 508 (e.g., PRB 510 and PRB 512) are used for PUCCH format 0 operated in FR2 in the range of 52.6 GHz to 70 GHz. The base sequence may be the same in the latter two examples.

Figure 6:
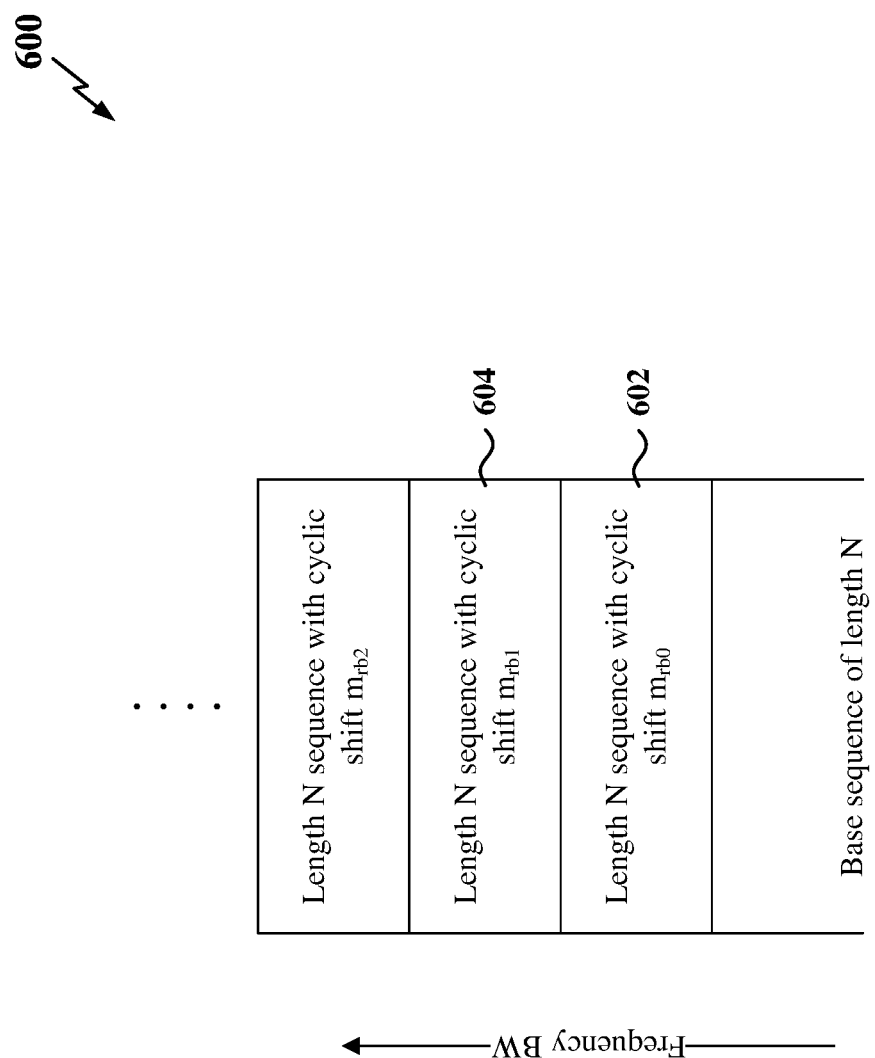
FIG. 6 is a conceptual illustration of an example of contiguous resource blocks according to some aspects.

FIG. 6 illustrates an example 600 of the sequences for PRBs (e.g., sequence 602 and sequence 604) for PUCCH format 0 in FR2 unlicensed band. With a 120 kHz SCS, contiguous PRBs may be used instead of the PRB interlaced design. For PUCCH format 0, different RB sets in the M PRBs may use a different cyclic shift with the same cyclic shift step size. The different M PRBs may use the same base sequence of length 12, but with different cyclic shifts for different PRBs. If the cyclic shift only depends on the RB index $m_{rb}$, (same as in NR-U FR1 design, but with an RB index within the interlace $m_{int}$ used instead of $m_{rb}$), Equation 3 may be used:

$$\alpha_l = \frac{2\pi}{N_{SC}^{RB}}\left((m_0 + m_{CS} + n_{CS}(n_{S,f}^\mu, l+l'))\bmod N_{SC}^{RB}\right) \quad \text{EQUATION 3}$$

where $m_{rb} = 5(i-1)$ for $i = 1, 2, \ldots, M$.

After every 12 PRBs, the cyclic shift will repeat the same pattern. This repetitiveness may adversely affect the PAPR of a transmission.

The disclosure relates in some aspect to adding another $m_{RBset}$ term in the equation, where $m_{RBset}=0$ for the first 12 PRBs, and $m_{RBset}=2n_{PRB}^\mu$, $6n_{PRB}^\mu$, $8\ n_{PRB}^\mu$ for every other 12 PRBs. The cyclic shift of a PRB is defined as:

$$\alpha_l = \frac{2\pi}{N_{SC}^{RB}} \quad \text{EQUATION 4}$$

$$\left((m_0 + m_{CS} + m_{rb} + m_{RBset} + n_{CS}(n_{S,f}^\mu, l+l'))\bmod N_{SC}^{RB}\right)$$

Figure 7:
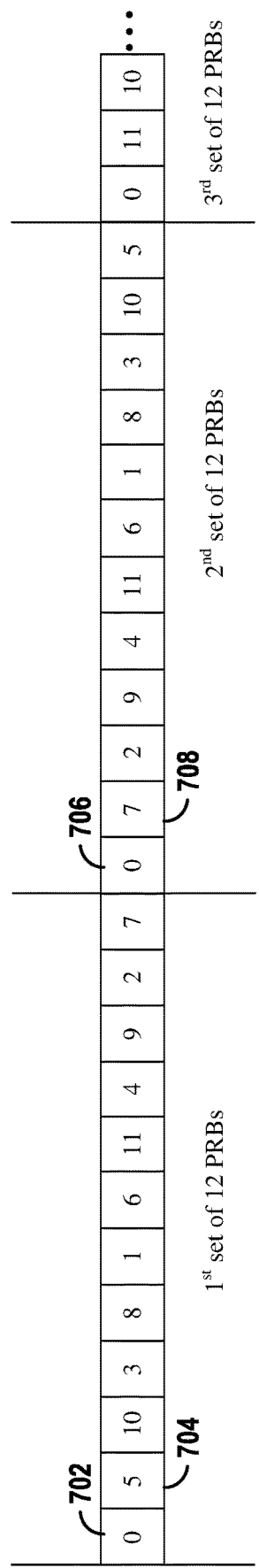
FIG. 7 is a conceptual illustration of an example of different cyclic shift ramping for different RB sets according to some aspects.

As a result, $m_{rb}+m_{RBset}=5n_{PRB}^\mu, 7n_{PRB}^\mu, 11n_{PRB}^\mu$, respectively for the $1^{st}/2^{nd}/3^{rd}$, etc., 12 RB sets. While there are PRBs with the same cyclic shift in different 12 RB sets, the cyclic shift used in different 12 RB sets is permuted differently, so there is no repeated pattern every 12 PRBs. For example, as shown in FIG. 7, the step size (e.g., from a first PRB 702 to a second PRB 704) for the first set of 12 PRBs is 5, the step size (e.g., from a third PRB 706 to a fourth PRB 708) for the second set of 12 PRBs is 7, the step size for the third set of 12 PRBs is 11, and so on. As such, the cyclic shifts used in different RB sets are permuted differently. The step sizes are designed so that combining $m_{rb}$ and $m_{RBset}$ results in a cyclic shift ramping with a step size that is co-prime with 12.

In some examples, the design may be backward compatible as well. For example, if the design reduces to a single PRB, the resulting cyclic shift for that PRB will be the same as in the Rel. 15 version. If the design reduces to a single RB set, the resulting cyclic shift for that RB set will be the same as in the Rel. 16 version.

The previous design may still have multiple RB sets with the same cyclic shift, which may hurt PAPR. The disclosure relates in some aspects to using different root sequences for different RB sets (e.g., to reduce the PAPR).

Figure 8:
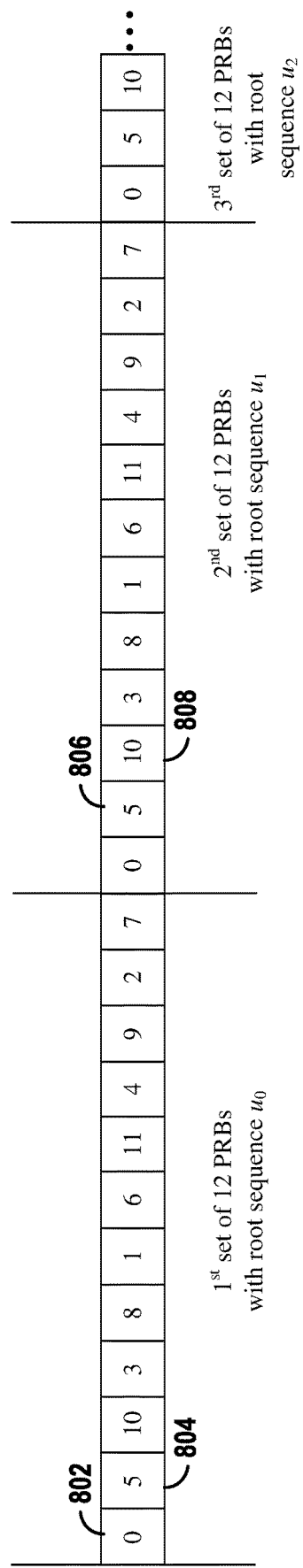
FIG. 8 is a conceptual illustration of an example of different root sequences for different RB sets according to some aspects.

For example, a root sequence change may be introduced for different RB sets. The root sequence may be a function of one or more of a cell ID, a hopping ID (if configured), time (if group hopping is configured), or a combination thereof. In some examples, the first RB set used by the PUCCH may use a legacy root sequence (e.g., a root sequence as defined in 3GPP TS 38.211, section 5.2, December 2019). Thus, backward compatibility may be maintained if only one RB set is used for PUCCH. If multiple RB sets are used (e.g., more than 12 PRBs are needed), for each 12 RB set, a different root sequence may be used. For example, as shown in FIG. 8, the first 12 PRBs may be generated using a root sequence based on an index $u_0$, the second 12 PRBs may be generated using a root sequence based on an index $u_1$, and so on. In the example of FIG. 8, different RB sets use the same cyclic shift ramping (e.g., ramping 0, 5, etc., as shown for a first PRB 802 and a second PRB 804 of the first RB set, and ramping 0, 5, etc., as shown for a third PRB 806 and a fourth PRB 808 of the second RB set). In other examples, different RB sets may use different cyclic shift ramping (e.g., as described herein).

In some examples, each additional root sequence (e.g., used for RB set 1, 2, etc.) may be a function of the first root sequence (e.g., used for RB set 0). For example, a root sequence index $u_i$ may be defined as set forth in Equation 5:

$$u_i = u + i \times R \bmod 30 \qquad \text{EQUATION 5}$$

Here, R may be chosen as a number that is co-prime with 30. The parameter u may correspond to the index used for the first root sequence. In addition, i may be the index for a 12 RB set, where i=0, 1, 2, or 3 in some examples.

Figure 9:
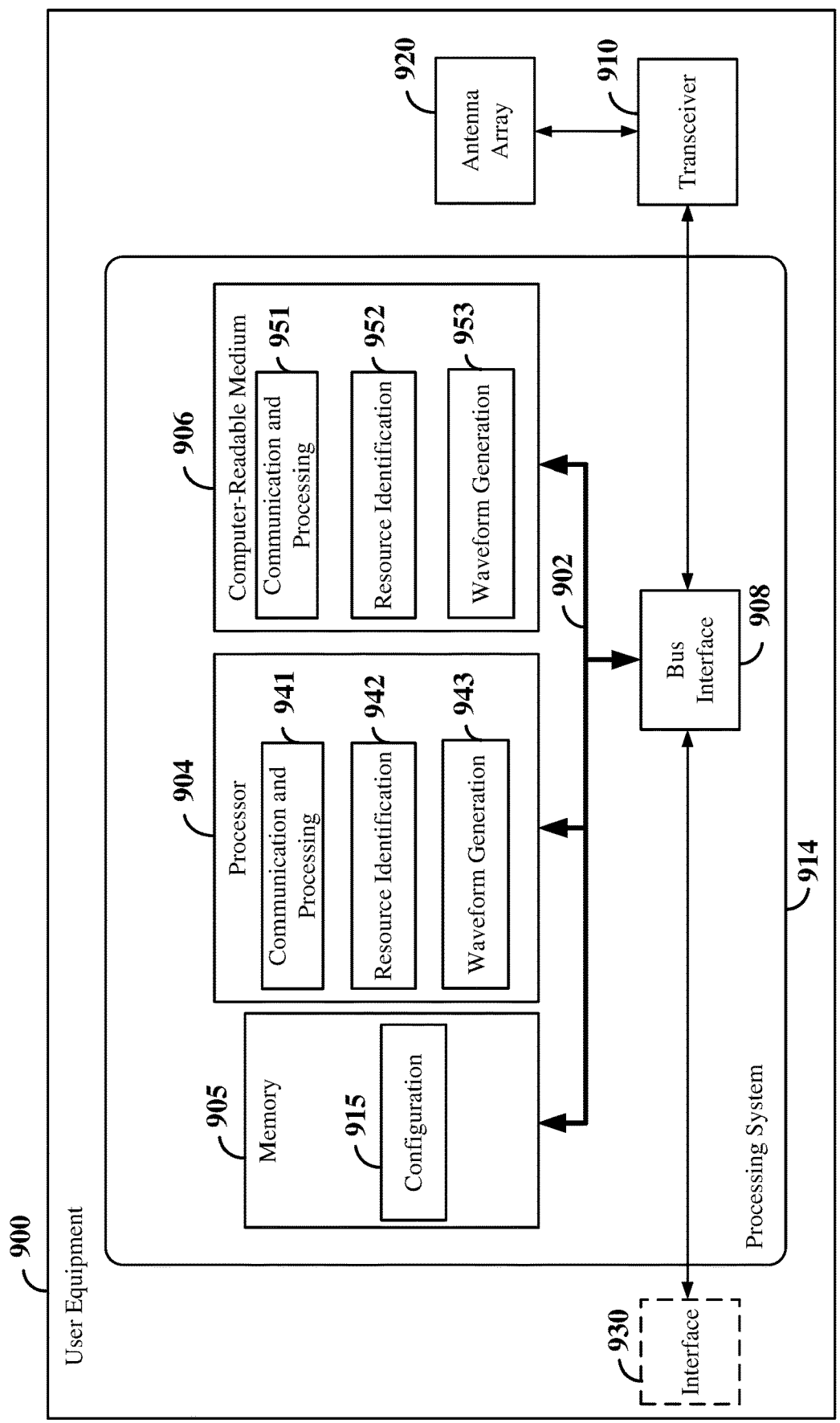
FIG. 9 is a block diagram conceptually illustrating an example of a hardware implementation for a user equipment employing a processing system according to some aspects.

FIG. 9 is a block diagram illustrating an example of a hardware implementation for a UE 900 employing a processing system 914. For example, the UE 900 may be a device configured to wirelessly communicate with a base station, as discussed in any one or more of FIGS. 1-8. In some implementations, the UE 900 may correspond to any of the UEs or scheduled entities shown in any of FIGS. 1 and 2.

In accordance with various aspects of the disclosure, an element, or any portion of an element, or any combination of elements may be implemented with the processing system 914. The processing system 914 may include one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 900 may be configured to perform any one or more of the functions described herein. That is, the processor 904, as utilized in a UE 900, may be used to implement any one or more of the processes and procedures described herein.

The processor 904 may in some instances be implemented via a baseband or modem chip and in other implementations, the processor 904 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910 and between the bus 902 and an interface 930. The transceiver 910 provides a communication interface or means for communicating with various other apparatus over a wireless transmission medium. In some examples, the UE may include two or more transceivers 910, each configured to communicate with a respective network type (e.g., terrestrial or non-terrestrial). The interface 930 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 930 may include a user interface (e.g., keypad, display, speaker, microphone, joystick). Of course, such a user interface is optional, and may be omitted in some examples, such as an IoT device.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software. For example, the memory 905 may store configuration information 915 (e.g., parameters associated with cyclic shifting and/or root sequences) used by the processor 904 in cooperation with the transceiver 910 to transmit uplink control information.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 900 may be configured to perform any one or more of the operations described herein (e.g., as described above in conjunction with FIGS. 1-8 and as described below in conjunction with FIGS. 10-12). In some aspects of the disclosure, the processor 904, as utilized in the UE 900, may include circuitry configured for various functions.

The processor 904 may include communication and processing circuitry 941. The communication and processing circuitry 941 may be configured to communicate with a base station, such as a gNB. The communication and processing circuitry 941 may include one or more hardware components that provide the physical structure that performs various processes related to wireless communication (e.g., signal reception and/or signal transmission) as described herein. The communication and processing circuitry 941 may further include one or more hardware components that provide the physical structure that performs various processes related to signal processing (e.g., processing a received signal and/or processing a signal for transmission) as described herein. In some examples, the communication and processing circuitry 941 may include two or more transmit/receive chains, each configured to process signals in a different RAT (or RAN) type. The communication and processing circuitry 941 may further be configured to execute communication and processing software 951 included on the computer-readable medium 906 to implement one or more functions described herein.

In some examples, the communication and processing circuitry 941 may be configured to receive and process downlink beamformed signals at a mmWave frequency or a sub-6 GHz frequency via the transceiver 910 and an antenna array 920. For example, the communication and processing circuitry 941 may be configured to receive a respective reference signal (e.g., SSB or CSI-RS) on each of a plurality of downlink beams from the base station during a downlink beam sweep via at least one first antenna panel of the antenna array 920. The communication and processing circuitry 941 may further be configured to transmit a beam measurement report to the base station.

In some examples, the communication and processing circuitry 941 may further be configured to generate and transmit uplink beamformed signals at a mmWave frequency or a sub-6 GHz frequency via the transceiver 910 and the antenna array 920. For example, the communication and processing circuitry 941 may be configured to transmit a respective reference signal (e.g., SRS or DMRS) on each of a plurality of uplink beams to the base station during an uplink beam sweep via at least one second antenna panel of the antenna array 920.

The communication and processing circuitry 941 may further be configured to generate and transmit a request to the base station. For example, the request may be included in a MAC-CE carried in a PUSCH, UCI in a PUCCH or PUSCH, a random access message, or a radio resource control (RRC) message. The communication and processing circuitry 941 may further be configured to generate and transmit a scheduling request (e.g., via UCI in a PUCCH) to the base station to receive an uplink grant for a PUSCH.

The communication and processing circuitry 941 may further be configured to generate and transmit an uplink signal on one or more uplink transmit beams applied to the uplink signal. The uplink signal may include, for example, a PUCCH, a PUSCH, an SRS, a DMRS, or a physical random access channel (PRACH).

The communication and processing circuitry 941 may further be configured to control the antenna array 920 and the transceiver 910 to search for and identify a plurality of downlink transmit beams during a downlink beam sweep. The communication and processing circuitry 941 may further be configured to obtain a plurality of beam measurements on each of a plurality of downlink receive beams via the antenna array 920 for each of the identified downlink transmit beams. The communication and processing circuitry 941 may further be configured to generate a beam measurement report for transmission to the base station using the transceiver 910.

The communication and processing circuitry 941 may further be configured to identify one or more selected uplink beam(s) based on the beam measurements obtained from the downlink beam reference signals. In some examples, the communication and processing circuitry 941 may be configured to compare the respective reference signal received power (RSRP) or other beam measurement measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 941 may be configured to generate one or more uplink transmit beams for transmission in an uplink beam sweep. Each uplink transmit beam may carry an uplink reference signal (e.g., an SRS) for measurement by the base station. The communication and processing circuitry 941 may further be configured to identify the selected uplink transmit beam(s) selected by the base station based on the uplink beam measurements. For example, the communication and processing circuitry 941 may be configured to receive an indication of the selected uplink transmit beam(s) from the base station.

In some implementations where the communication involves receiving information, the communication and processing circuitry 941 may obtain information from a component of the UE 900 (e.g., from the transceiver 910 that receives the information via radio frequency signaling or some other type of signaling suitable for the applicable communication medium), process (e.g., decode) the information, and output the processed information. For example, the communication and processing circuitry 941 may output the information to another component of the processor 904, to the memory 905, or to the bus interface 908. In some examples, the communication and processing circuitry 941 may receive one or more of signals, messages, other information, or any combination thereof. In some examples, the communication and processing circuitry 941 may receive information via one or more channels. In some examples, the communication and processing circuitry 941 may include functionality for a means for receiving. In some examples, the communication and processing circuitry 941 may include functionality for a means for decoding.

In some implementations where the communication involves sending (e.g., transmitting) information, the communication and processing circuitry 941 may obtain information (e.g., from another component of the processor 904, the memory 905, or the bus interface 908), process (e.g., encode) the information, and output the processed information. For example, the communication and processing circuitry 941 may output the information to the transceiver 910 (e.g., that transmits the information via radio frequency signaling or some other type of signaling suitable for the applicable communication medium). In some examples, the communication and processing circuitry 941 may send one or more of signals, messages, other information, or any combination thereof. In some examples, the communication and processing circuitry 941 may send information via one or more channels. In some examples, the communication and processing circuitry 941 may include functionality for a means for sending (e.g., a means for transmitting). In some examples, the communication and processing circuitry 941 may include functionality for a means for encoding.

The processor 904 may include resource identification circuitry 942 configured to perform resource identification-related operations as discussed herein (e.g., one or more of the operations described in conjunction with FIGS. 5-8). The resource identification circuitry 942 may include functionality for a means for identifying RB sets (e.g., by receiving scheduling information from a gNB that selected a number of RB sets for the UE 900 to use for a PUCCH transmission). The resource identification circuitry 942 may further be configured to execute resource identification software 952 included on the computer-readable medium 906 to implement one or more functions described herein. In some examples, the resource identification circuitry 942 may monitor a designated channel (e.g., a PDCCH or PDSCH) for scheduling information from a gNB. In some examples, the resource identification circuitry 942 may decode information received from a gNB. In some examples, the resource identification circuitry 942 may parse received information to determine whether RB sets have been allocated for the UE 900 to transmit on a PUCCH.

The processor 904 may include waveform generation circuitry 943 configured to perform waveform generation-related operations as discussed herein (e.g., one or more of the operations described in conjunction with FIGS. 5-8). The waveform generation circuitry 943 may include functionality for a means for determining cyclic shift ramping (e.g., determining different cyclic shift ramping sets to use for different RB sets and/or determining at least one cyclic shift ramping set to use for different RB sets in conjunction with different root sequences. The waveform generation circuitry 943 may include functionality for a means for transmitting uplink control information (e.g., generating PUCCH signals with the determined cyclic shift ramping and transmitting the PUCCH signals on the scheduled RB sets). The waveform generation circuitry 943 may further be configured to execute waveform generation software 953 included on the computer-readable medium 906 to implement one or more functions described herein. In some examples, the waveform generation circuitry 943 may determine whether the same cyclic shift set or different cyclic shift sets are to be used for different RB sets (e.g., based on whether the PAPR needs to be reduced). In some examples, the waveform generation circuitry 943 may encode uplink control signals. In some examples, the waveform generation circuitry 943 may transmit uplink control signals on scheduled RB sets. In some examples, the waveform generation circuitry 943 may select a first ramping sequence (e.g., 0, 5, 10, . . . ) for a first RB set and select a second ramping sequence (e.g., 0, 7, 2, . . . ) for a second RB set. In some examples, the waveform generation circuitry 943 may generate information to be transmitted on an RB set using a root sequence. In some examples, the waveform generation circuitry 943 may determine a root sequence for one RB set based on a root sequence for another RB set.

Figure 10:
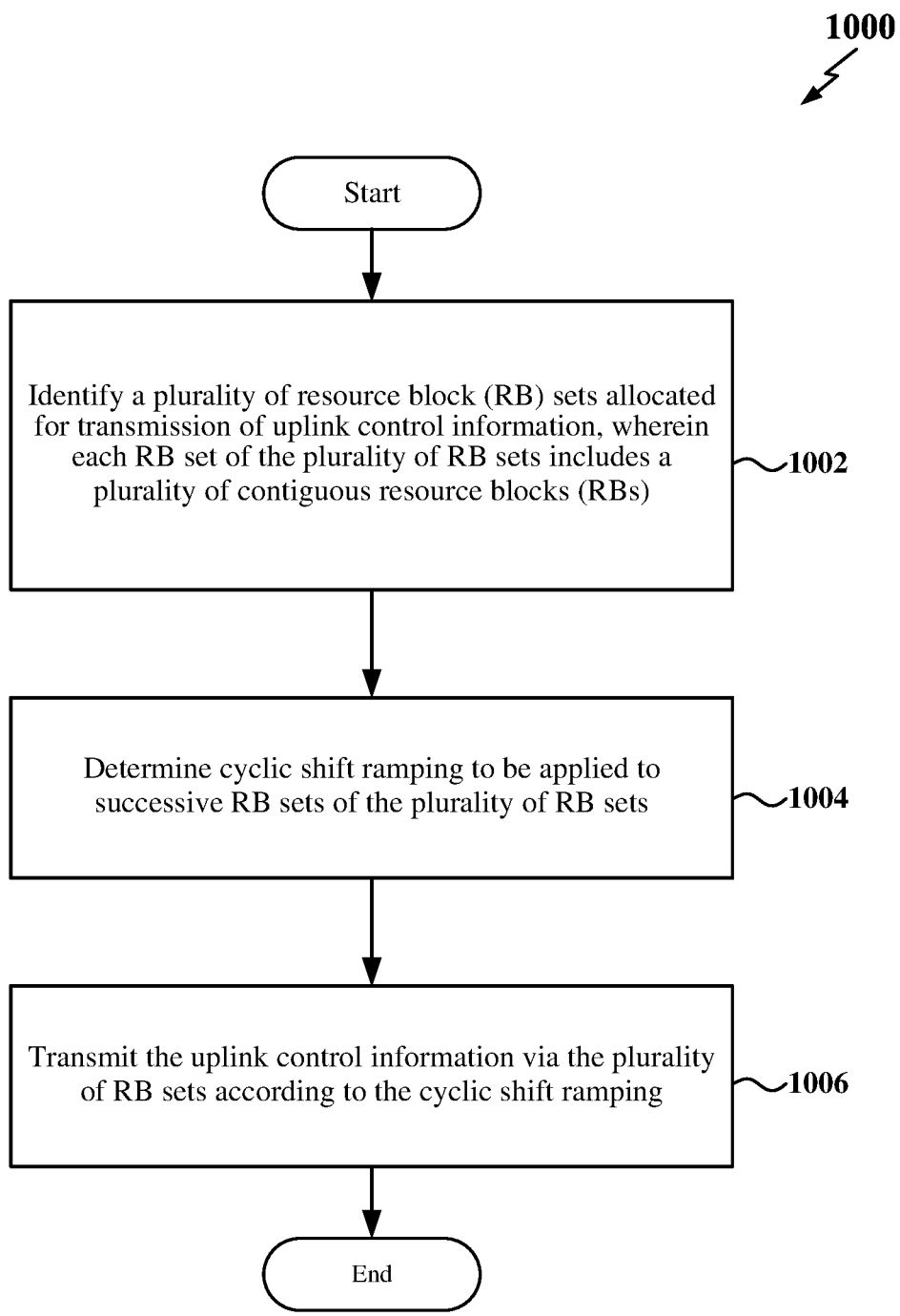
FIG. 10 is a flow chart illustrating an example method employing cyclic shift ramping according to some aspects.

FIG. 10 is a flow chart illustrating an example method 1000 for wireless communication in accordance with some aspects of the present disclosure. As described below, some or all illustrated features may be omitted in a particular implementation within the scope of the present disclosure, and some illustrated features may not be required for implementation of all examples. In some examples, the method 1000 may be carried out by the UE 900 illustrated in FIG. 9. In some examples, the method 1000 may be carried out by any suitable apparatus or means for carrying out the functions or algorithm described below.

At block 1002, a UE may identify a plurality of resource block (RB) sets (e.g., PRB sets) allocated for transmission of uplink control information, wherein each RB set of the plurality of RB sets includes (e.g., constitutes) a plurality of contiguous resource blocks (RBs). For example, the resource identification circuitry 942 together with the communication and processing circuitry 941 and transceiver 910, shown and described above in connection with FIG. 9, may monitor a designated channel (e.g., a PDCCH or PDSCH) for scheduling information from a gNB. The resource identification circuitry 942 may then decode any received information and parse the information to determine whether RB sets have been allocated for the UE to transmit on a PUCCH.

In some examples, a first RB and a second RB are contiguous if there is no intervening RB between the first RB and the second RB (e.g., in the corresponding PUCCH allocation). In some examples, the plurality of RB sets may include (e.g., may constitute) a plurality of contiguous RB sets. In some examples, a first RB set and a second RB set are contiguous if there is no intervening RB set between the first RB set and the second RB set (e.g., in the corresponding PUCCH allocation).

At block 1004, the UE may determine cyclic shift ramping to be applied to successive RB sets of the plurality of RB sets. For example, the waveform generation circuitry 943, shown and described above in connection with FIG. 9, may determine whether the same cyclic shift set or different cyclic shift sets are to be used for different RB sets (e.g., based on whether the PAPR needs to be reduced).

In some examples, the cyclic shift ramping is based on a first cyclic shift ramping and a second cyclic shift ramping. In some examples, the second cyclic shift ramping is different from the first cyclic shift ramping. For example, the resulting cyclic shifts may be permuted differently. In some examples, the first cyclic shift ramping is based on a cyclic shift equation including a first cyclic shift ramping value that is based on a resource block index for each RB set. In some examples, the second cyclic shift ramping is based on the cyclic shift equation further including a second cyclic shift ramping value that is based on an RB set index. In some examples, a sum of the first cyclic shift ramping value and the second cyclic shift ramping value for a particular RB set of the plurality of RB sets is coprime with a length of resource elements (REs) in an RB (e.g., PRB) of the plurality of RB sets.

At block 1006, the UE may transmit the uplink control information via the plurality of RB sets according to the cyclic shift ramping. For example, the waveform generation circuitry 943 in cooperation with the communication and processing circuitry 941 and transceiver 910, shown and described above in connection with FIG. 9, may encode and transmit uplink control signals on the designated RB sets whereby the cyclic shift ramping is applied to the signals such that signals transmitted in different PRBs may be subject to different cyclic shifts.

In some examples, transmitting the uplink control information via the plurality of RB sets may include transmitting a physical uplink control channel (PUCCH) via the plurality of RB sets. In some examples, transmitting the uplink control information via the plurality of RB sets may include transmitting the uplink control information via the plurality of RB sets on a shared radio frequency spectrum. In some examples, the shared radio frequency spectrum may include a millimeter wave frequency spectrum. In some examples, the shared radio frequency spectrum may include an unlicensed radio frequency spectrum.

In some examples, determining the cyclic shift ramping may include determining a first cyclic shift set to be applied to a first set of contiguous RBs of a first RB set of the plurality of RB sets. In some examples determining the cyclic shift ramping may include determining a second cyclic shift set to be applied to a second set of contiguous RBs of a second RB set of the plurality of RB sets, wherein the second cyclic shift set is different from the first cyclic shift set. For example, the order of the shift values in the first cyclic shift set may be different from the order of the shift values in the second cyclic shift set. In some examples, a step size of the first cyclic shift set is coprime with a length of resource elements (REs) in an RB of the first RB set.

In some examples, transmitting the uplink control information via the plurality of RB sets according to the cyclic shift ramping may include transmitting the first RB set according to the first cyclic shift set. In some examples, transmitting the uplink control information via the plurality of RB sets according to the cyclic shift ramping may include transmitting the second RB set according to the second cyclic shift set.

In some examples, determining the first cyclic shift set may include calculating a first cyclic shift value based on a first RB set index of the first RB set. In some examples, determining the second cyclic shift set may include calculating a second cyclic shift value based on a second RB set index of the second RB set.

In some examples, the method 1000 may further include generating first information for a first RB set of the plurality of RB sets using a first root sequence. In some examples, the method 1000 may further include generating second information for a second RB set of the plurality of RB sets using a second root sequence, wherein the second root sequence is different from the first root sequence. In some examples, the first root sequence is based on a first index u into a table including a number of entries, the second root sequence is based on a second index $u_i = u + i \times R$ mod 30 into the table, i is an RB set index, and R is a number that is coprime with the number of entries of the table.

Figure 11:
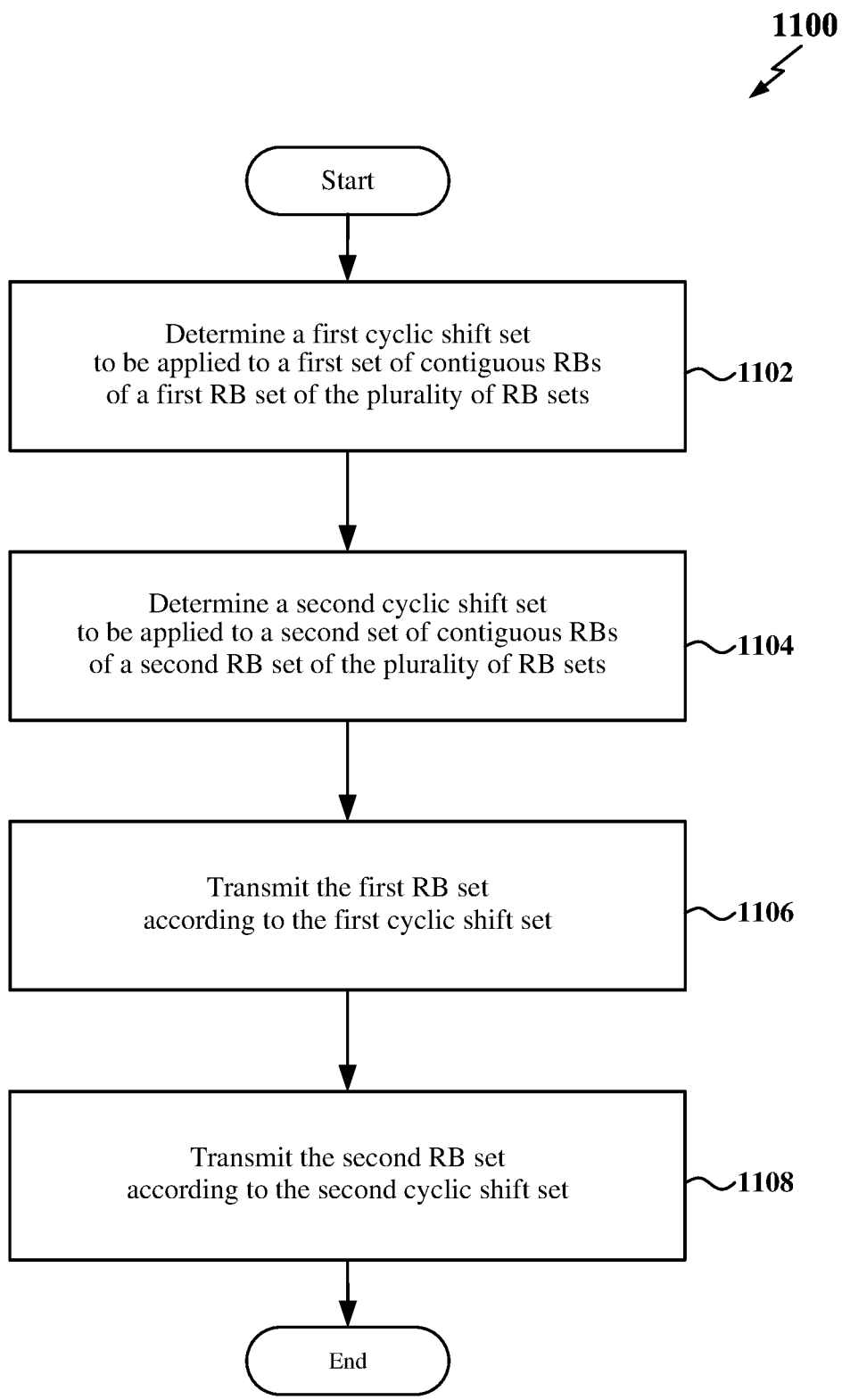
FIG. 11 is a flow chart illustrating an example method employing different cyclic shift sets according to some aspects.

FIG. 11 is a flow chart illustrating an example method 1100 for wireless communication in accordance with some aspects of the present disclosure. In some examples, one or more aspects of the method 1100 may be implemented in conjunction with (e.g., as part of and/or in addition to) the method 1000 of FIG. 10. As described below, some or all illustrated features may be omitted in a particular implementation within the scope of the present disclosure, and some illustrated features may not be required for implementation of all examples. In some examples, the method 1100 may be carried out by the UE 900 illustrated in FIG. 9. In some examples, the method 1100 may be carried out by any suitable apparatus or means for carrying out the functions or algorithm described below.

At block 1102, a UE may determine a first cyclic shift set to be applied to a first set of contiguous RBs of a first RB set of the plurality of RB sets. For example, the waveform generation circuitry 943, shown and described above in connection with FIG. 9, may select a first ramping sequence (e.g., 0, 5, 10, . . . ) for the first RB set. In some examples, the determination of the first cyclic shift set may be based on $m_{RBset}=0$ for the first 12 PRBs, and $m_{RBset}=2n_{IRB}^{\mu}$, $6n_{IRB}^{\mu}$, $8 n_{IRB}^{\mu}$, etc., for subsequent sets of 12 PRBs.

At block 1104, the UE may determine a second cyclic shift set to be applied to a second set of contiguous RBs of a second RB set of the plurality of RB sets. For example, the waveform generation circuitry 943, shown and described above in connection with FIG. 9, may select a second ramping sequence (e.g., 0, 7, 2, . . . ) for the second RB set. In some examples, the determination of the second cyclic shift set may be based on $m_{RBset}=0$ for the first 12 PRBs, and $m_{RBset}=2n_{IRB}^{\mu}$, $6n_{IRB}^{\mu}$, $8 n_{IRB}^{\mu}$, etc., for subsequent sets of 12 PRBs.

At block 1106, the UE may transmit the first RB set according to the first cyclic shift set. For example, the waveform generation circuitry 943 in cooperation with the communication and processing circuitry 941 and transceiver 910, shown and described above in connection with FIG. 9, may encode and transmit uplink control signals on the RBs of the first RB set.

At block 1108, the UE may transmit the second RB set according to the second cyclic shift set. For example, the waveform generation circuitry 943 in cooperation with the communication and processing circuitry 941 and transceiver 910, shown and described above in connection with FIG. 9, may encode and transmit uplink control signals on the RBs of the second RB set.

Figure 12:
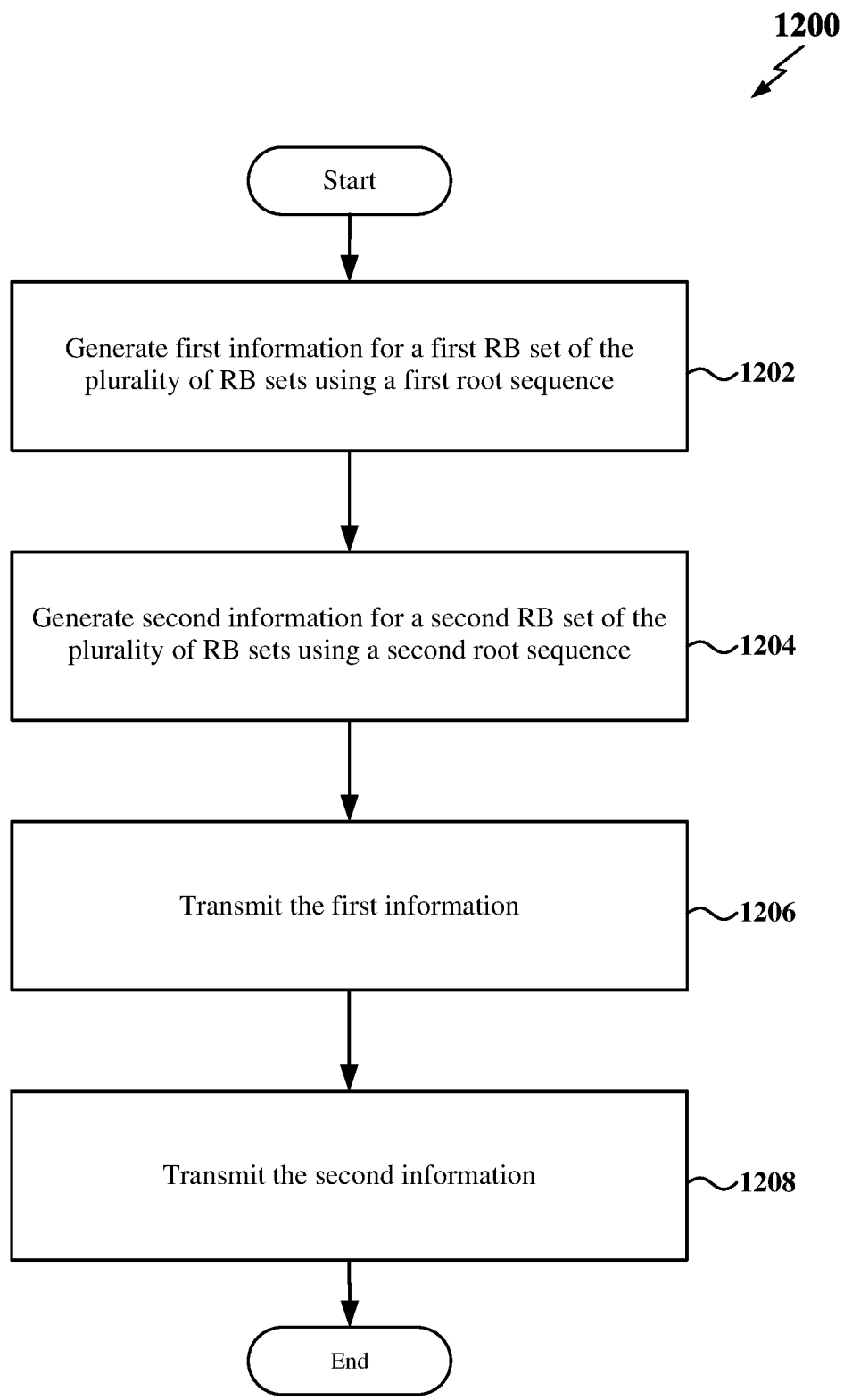
FIG. 12 is a flow chart illustrating an example method employing different root sequences according to some aspects.

FIG. 12 is a flow chart illustrating an example method 1200 for wireless communication in accordance with some aspects of the present disclosure. In some examples, one or more aspects of the method 1200 may be implemented in conjunction with (e.g., as part of and/or in addition to) the method 1000 of FIG. 10. As described below, some or all illustrated features may be omitted in a particular implementation within the scope of the present disclosure, and some illustrated features may not be required for implementation of all examples. In some examples, the method 1200 may be carried out by the UE 900 illustrated in FIG. 9. In some examples, the method 1200 may be carried out by any suitable apparatus or means for carrying out the functions or algorithm described below.

At block 1202, a UE may generate first information for a first RB set of the plurality of RB sets using a first root sequence. For example, the waveform generation circuitry 943 may determine a root sequence based on at least one of a cell ID, a hopping ID, or time. The waveform generation circuitry 943 may then generate information to be transmitted on the first RB set using this root sequence. In some examples, this root sequence may be a legacy root sequence (e.g., a root sequence as defined in 3GPP TS 38.211, section 5.2, December 2019).

At block 1204, the UE may generate second information for a second RB set of the plurality of RB sets using a second root sequence. For example, the waveform generation circuitry 943 may determine a root sequence that is different from the root sequence used at block 1202. In some examples, the waveform generation circuitry 943 may determine this root sequence as a function of the first root sequence (e.g., $u_i = u + i \times R$ mod 30, where R is chosen as a number co-prime with 30 and i is 12 RB set index with i=0,1,2,3).

At block 1206, the UE may transmit the first information. For example, the waveform generation circuitry 943 in cooperation with the communication and processing circuitry 941 and transceiver 910, shown and described above in connection with FIG. 9, may encode and transmit uplink control signals to a gNB via the RBs of the first RB set.

At block 1208, the UE may transmit the second information. For example, the waveform generation circuitry 943 in cooperation with the communication and processing circuitry 941 and transceiver 910, shown and described above in connection with FIG. 9, may encode and transmit uplink control signals to a gNB via the RBs of the second RB set.

Figure 13:
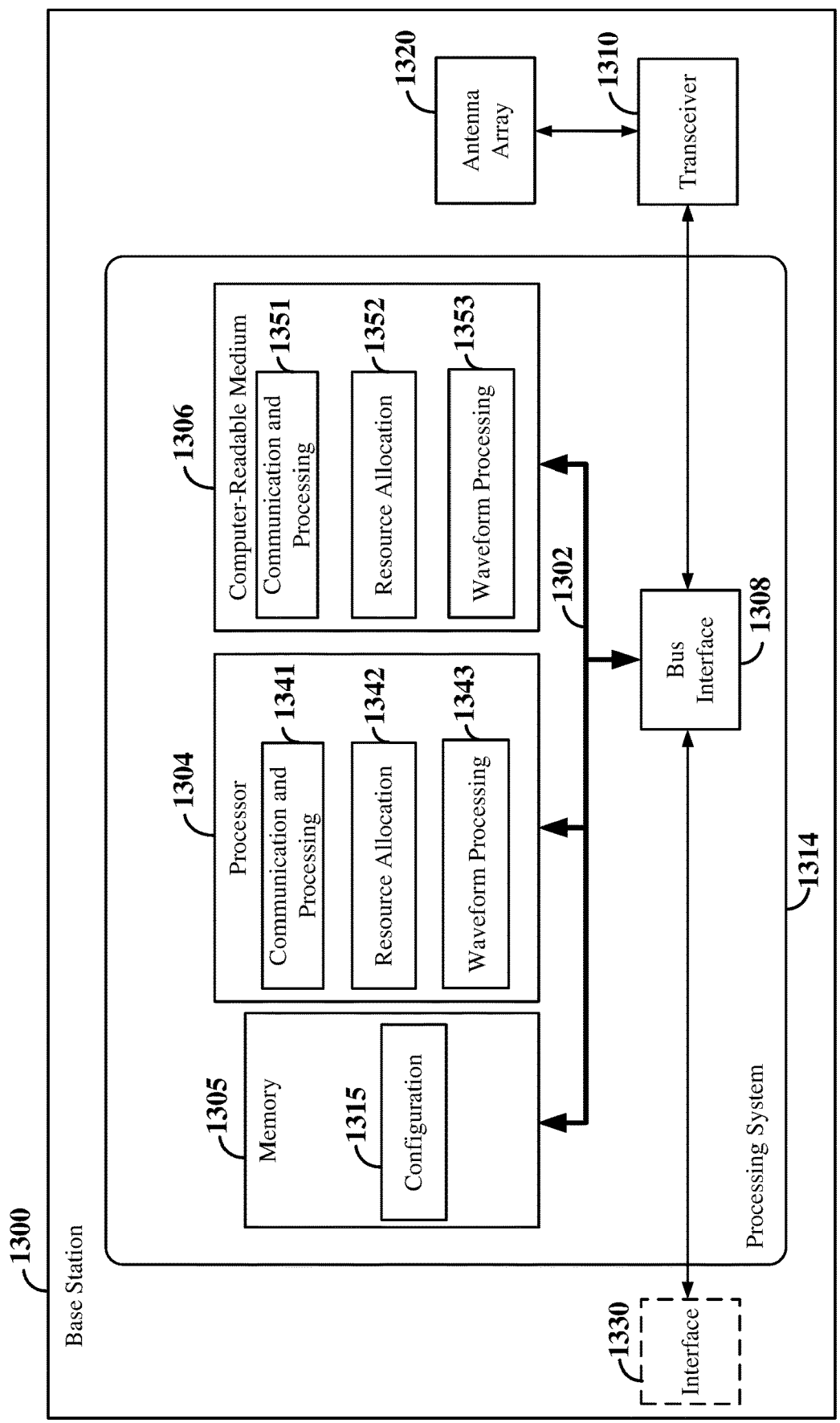
FIG. 13 is a block diagram conceptually illustrating an example of a hardware implementation for a base station employing a processing system according to some aspects.

FIG. 13 is a conceptual diagram illustrating an example of a hardware implementation for base station (BS) 1300 employing a processing system 1314. In some implementations, the BS 1300 may correspond to any of the BSs (e.g., gNBs) or scheduling entities shown in any of FIGS. 1 and 2.

In accordance with various aspects of the disclosure, an element, or any portion of an element, or any combination of elements may be implemented with the processing system 1314. The processing system may include one or more processors 1304. The processing system 1314 may be substantially the same as the processing system 914 illustrated in FIG. 9, including a bus interface 1308, a bus 1302, memory 1305, a processor 1304, and a computer-readable medium 1306. The memory 1305 may store configuration information 915 (e.g., parameters associated with cyclic shifting and/or root sequences) used by the processor 904 in cooperation with the transceiver 910 to receive uplink control information. Furthermore, the BS 1300 may include an interface 1330 (e.g., a network interface) that provides a means for communicating with at least one other apparatus within a core network and with at least one radio access network.

The BS 1300 may be configured to perform any one or more of the operations described herein (e.g., as described above in conjunction with FIGS. 1-8 and as described below in conjunction with FIGS. 14-16). In some aspects of the disclosure, the processor 1304, as utilized in the BS 1300, may include circuitry configured for various functions.

The processor 1304 may be configured to generate, schedule, and modify a resource assignment or grant of time-frequency resources (e.g., a set of one or more resource elements). For example, the processor 1304 may schedule time-frequency resources within a plurality of time division duplex (TDD) and/or frequency division duplex (FDD) subframes, slots, and/or mini-slots to carry user data traffic and/or control information to and/or from multiple UEs.

The processor 1304 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources indicated in a request for uplink beam refinement received from a UE. The processor 1304 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 1304 may further be configured to schedule resources that may be utilized by the UE to transmit the request. For example, the uplink beam refinement request resources may include resources scheduled for transmission of a PUCCH, PUSCH, PRACH occasion or RRC message. In some examples, the processor 1304 may be configured to schedule PUSCH resources for the uplink beam refinement request in response to receiving a scheduling request from the UE.

The processor 1304 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

In some aspects of the disclosure, the processor 1304 may include communication and processing circuitry 1341. The communication and processing circuitry 1344 may be configured to communicate with a UE. The communication and processing circuitry 1341 may include one or more hardware components that provide the physical structure that performs various processes related to communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. The communication and processing circuitry 1341 may further be configured to execute communication and processing software 1351 included on the computer-readable medium 1306 to implement one or more functions described herein.

In some examples, the communication and processing circuitry 1341 may be configured to receive and process uplink beamformed signals at a mmWave frequency or a sub-6 GHz frequency via the transceiver 1310 and an antenna array 1320. For example, the communication and processing circuitry 1341 may be configured to receive a respective reference signal (e.g., SRS or DMRS) on each of a plurality of uplink beams from the UE during an uplink beam sweep.

In some examples, the communication and processing circuitry 1341 may further be configured to generate and transmit downlink beamformed signals at a mmWave frequency or a sub-6 GHz frequency via the transceiver 1310 and the antenna array 1320. For example, the communication and processing circuitry 1341 may be configured to transmit a respective downlink reference signal (e.g., SSB or CSI-RS) on each of a plurality of downlink beams to the UE during a downlink beam sweep via at least one first antenna panel of the antenna array 1320. The communication and processing circuitry 1341 may further be configured to receive a beam measurement report from the UE.

The communication and processing circuitry 1341 may further be configured to receive a request from the UE. For example, the request may be included in a MAC-CE carried in a PUSCH, UCI in a PUCCH or PUSCH, a random access message, or an RRC message. The communication and processing circuitry 1341 may further be configured to receive a scheduling request (e.g., via UCI in a PUCCH) from the UE for an uplink grant for the PUSCH carrying the MAC-CE.

The communication and processing circuitry 1341 may further be configured to receive an uplink signal on one or more uplink receive beams via one or more uplink transmit beams applied to the uplink signal. For example, the communication and processing circuitry 1341 may be configured to receive the uplink signal on one or more uplink receive beams via at least one second antenna panel of the antenna array 1320. The uplink signal may include, for example, a PUCCH, PUSCH, SRS, DMRS, or PRACH.

The communication and processing circuitry 1341 may further be configured to control the antenna array 1320 and transceiver 1310 to generate a plurality of downlink transmit beams during a downlink beam sweep. The communication and processing circuitry 1341 may further be configured to receive a beam measurement report from the UE using the communication and processing circuitry 1344. The communication and processing circuitry 1341 may further be configured to identify one or more selected uplink beam(s) based on the beam measurements. In some examples, the communication and processing circuitry 1341 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 1341 may be configured to receive one or more uplink transmit beams in an uplink beam sweep. Each uplink transmit beam may carry an uplink reference signal (e.g., an SRS) for measurement by the communication and processing circuitry 1341. The communication and processing circuitry 1341 may further be configured to obtain a plurality of beam measurements on each of a plurality of uplink receive beams of the antenna array 1320 for each of the uplink transmit beams. The communication and processing circuitry 1341 may further be configured to select the selected uplink transmit beam(s) and corresponding uplink receive beams forming respective uplink BPLs based on the uplink beam measurements.

In some implementations wherein the communication involves receiving information, the communication and processing circuitry 1341 may obtain information from a component of the BS 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving. In some examples, the communication and processing circuitry 1341 may include functionality for a means for decoding.

In some implementations wherein the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for sending (e.g., a means for transmitting). In some examples, the communication and processing circuitry 1341 may include functionality for a means for encoding.

The processor 1304 may include resource allocation circuitry 1342 configured to perform resource allocation-related operations as discussed herein (e.g., one or more of the allocation operations described in conjunction with FIGS. 5-8). The resource allocation circuitry 1342 may include functionality for a means for generating an indication of a plurality of RB sets (e.g., generating a grant for an uplink transmission, where the grant schedules a number of candidate RBs sets for an uplink transmission that are sufficient to close a link to the BS 1300). The resource allocation circuitry 1342 may include functionality for a means for transmitting the indication (e.g., transmitting the grant on a PUCCH or PUSCH). The resource allocation circuitry 1342 may further be configured to execute resource allocation software 1352 included on the computer-readable medium 1306 to implement one or more functions described herein. In some examples, the resource allocation circuitry 1342 may schedule candidate RB sets for a PUCCH transmission by a UE. In some examples, the resource allocation circuitry 1342 may send a grant to a UE on a specified channel, where the grant schedules a PUCCH transmission by the UE.

The processor 1304 may include waveform processing circuitry 1343 configured to perform waveform processing-related operations as discussed herein (e.g., one or more of the waveform processing operations described in conjunction with FIGS. 5-8). The waveform processing circuitry 1343 may include functionality for a means for receiving information based on cyclic shift ramping (e.g., decoding received uplink signals that have been subject to a known cyclic shift). The waveform processing circuitry 1343 may further be configured to execute waveform processing software 1353 included on the computer-readable medium 1306 to implement one or more functions described herein. In some examples, the waveform processing circuitry 1343 may monitor one or more RB sets (e.g., according to uplink scheduling) for PUCCH signals. In some examples, the waveform processing circuitry 1343 may decode any received PUCCH signals that were transmitted with an expected form of cyclic shift ramping (e.g., a particular cyclic shift set applied to each RB set). In some examples, the waveform processing circuitry 1343 may select a first ramping sequence (e.g., 0, 5, 10, . . . ) for a first RB set and select a second ramping sequence (e.g., 0, 7, 2, . . . ) for a second RB set. In some examples, the waveform processing circuitry 1343 may receive uplink control signals on the RBs of a first RB set and receive uplink control signals on the RBs of a second RB set. In some examples, the waveform processing circuitry 1343 may decode received uplink control signals to recover uplink control information transmitted by a UE. In some examples, the waveform processing circuitry 1343 may determine a root sequence for receiving uplink control signals.

Figure 14:
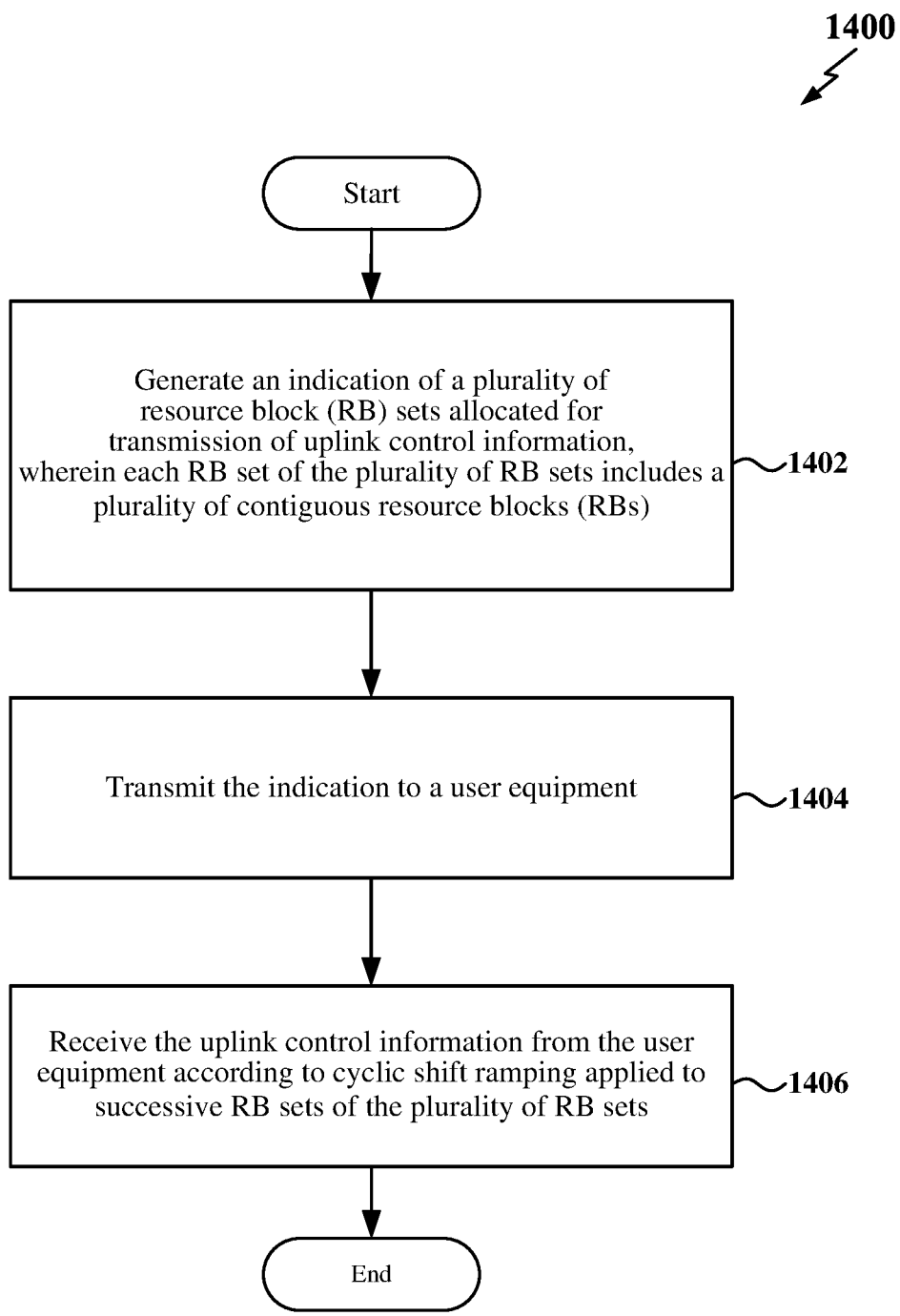
FIG. 14 is a flow chart illustrating an example method employing cyclic shift ramping according to some aspects.

FIG. 14 is a flow chart illustrating an example method 1400 for wireless communication in accordance with some aspects of the present disclosure. As described below, some or all illustrated features may be omitted in a particular implementation within the scope of the present disclosure, and some illustrated features may not be required for implementation of all examples. In some examples, the method 1400 may be carried out by the BS 1300 illustrated in FIG. 13. In some examples, the method 1400 may be carried out by any suitable apparatus or means for carrying out the functions or algorithm described below.

At block 1402, a BS may generate an indication of a plurality of resource block (RB) sets allocated for transmission of uplink control information, wherein each RB set of the plurality of RB sets includes a plurality of contiguous resource blocks (RBs). In some examples, the plurality of RB sets may include a plurality of contiguous RB sets. For example, the resource allocation circuitry 1342, shown and described above in connection with FIG. 13, may schedule candidate RB sets for a PUCCH transmission by a UE.

At block 1404, the BS may transmit the indication to a user equipment. For example, the resource allocation circuitry 1342 together with the communication and processing circuitry 1341 and transceiver 1310, shown and described above in connection with FIG. 13, may send a grant to a UE on a specified channel, where the grant schedules a PUCCH transmission by the UE.

At block 1406, the BS may receive the uplink control information from the user equipment according to cyclic shift ramping applied to successive RB sets of the plurality of RB sets. For example, the waveform processing circuitry 1343 in cooperation with the communication and processing circuitry 1341 and transceiver 1310, shown and described above in connection with FIG. 13, may monitor one or more RB sets (e.g., according to uplink scheduling) for PUCCH signals and then decode any received PUCCH signals that were transmitted with an expected form of cyclic shift ramping (e.g., a particular cyclic shift set applied to each RB set).

In some examples, receiving the uplink control information via the plurality of RB sets may include receiving a physical uplink control channel (PUCCH) via the plurality of RB sets. In some examples, receiving the uplink control information via the plurality of RB sets may include receiving the uplink control information via the plurality of RB sets on a shared radio frequency spectrum. In some examples, the shared radio frequency spectrum may include a millimeter wave frequency spectrum. In some examples, the shared radio frequency spectrum may include an unlicensed radio frequency spectrum.

In some examples, receiving the uplink control information may include receiving first information for a first RB set of the plurality of RB sets based on a first root sequence. In some examples, receiving the uplink control information may include receiving second information for a second RB set of the plurality of RB sets based on a second root sequence, wherein the second root sequence is different from the first root sequence. In some examples, the first sequence is based on a first index u into a table including a number of entries, the second sequence is based on a second index $u_i = u + i \times R \mod 30$ into the table, i is an RB set index, and R is a number that is coprime with the number of entries of the table.

In some examples, the cyclic shift ramping is based on a first cyclic shift ramping and a second cyclic shift ramping. In some examples, the second cyclic shift ramping is different from the first cyclic shift ramping. In some examples, the first cyclic shift ramping is based on a cyclic shift equation including a first cyclic shift ramping value that is based on a resource block index for each RB set. In some examples, the second cyclic shift ramping is based on the cyclic shift equation further including a second cyclic shift ramping value that is based on an RB set index. In some examples, a sum of the first cyclic shift ramping value and the second cyclic shift ramping value for a particular RB set of the plurality of RB sets is coprime with a length of resource elements (REs) in an RB of the plurality of RB sets.

In some examples, the cyclic shift ramping may include a first cyclic shift set applied to a first set of contiguous RBs of a first RB set of the plurality of RB sets. In some examples, the cyclic shift ramping may include a second cyclic shift set applied to a second set of contiguous RBs of a second RB set of the plurality of RB sets, wherein the second cyclic shift set is different from the first cyclic shift set. In some examples, a step size of the first cyclic shift set is coprime with a length of resource elements (REs) in an RB of the first RB set.

In some examples, receiving the uplink control information via the plurality of RB sets according to the cyclic shift ramping may include receiving the first RB set according to the first cyclic shift set. In some examples, receiving the uplink control information via the plurality of RB sets according to the cyclic shift ramping may include receiving the second RB set according to the second cyclic shift set.

In some examples, the first cyclic shift set is based on a first RB set index of the first RB set. In some examples, the second cyclic shift set is based on a second RB set index of the second RB set.

Figure 15:
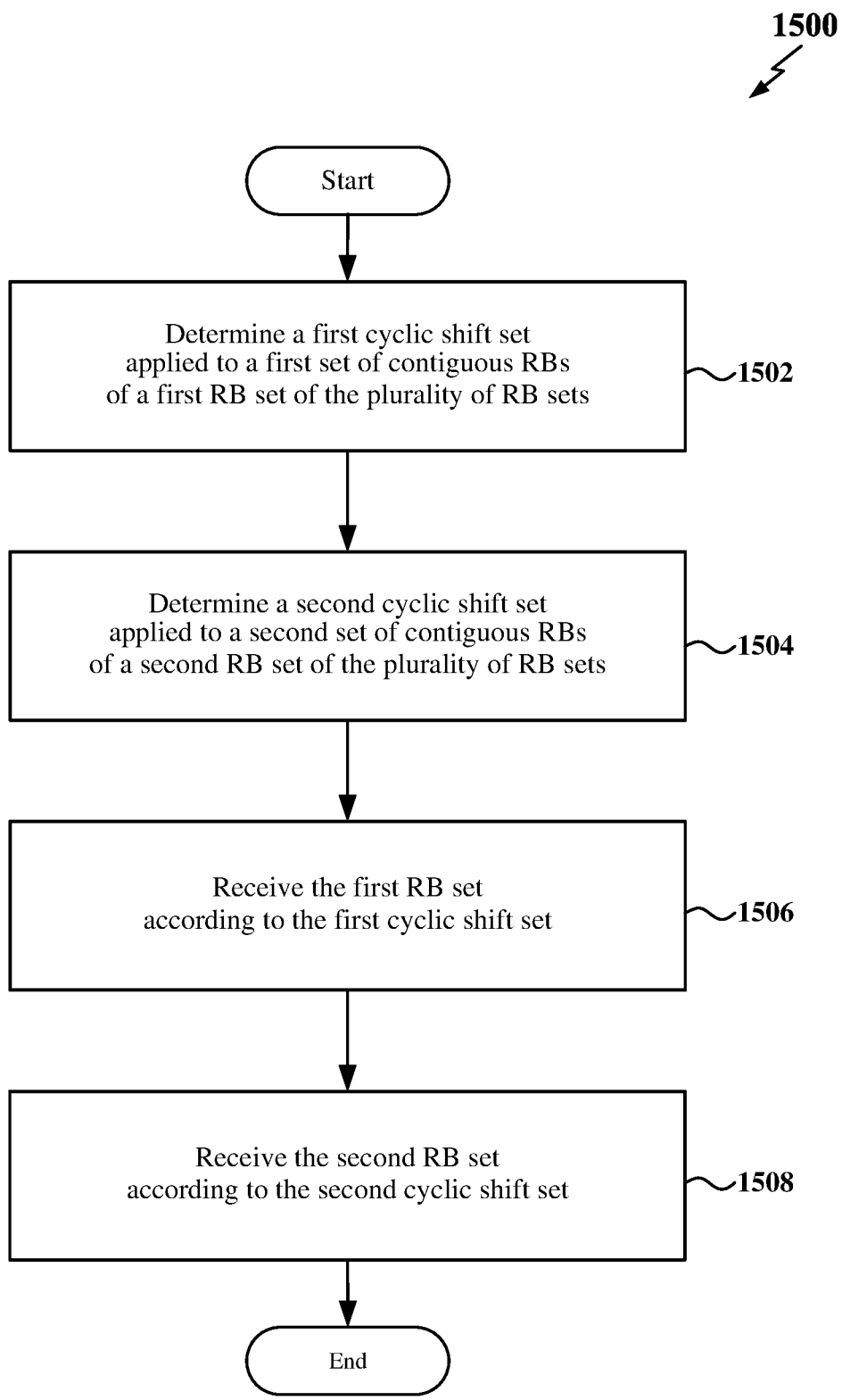
FIG. 15 is a flow chart illustrating an example method employing different cyclic shift sets according to some aspects.

FIG. 15 is a flow chart illustrating an example method 1500 for wireless communication in accordance with some aspects of the present disclosure. In some examples, one or more aspects of the method 1500 may be implemented in conjunction with (e.g., as part of and/or in addition to) the method 1400 of FIG. 14. As described below, some or all illustrated features may be omitted in a particular implementation within the scope of the present disclosure, and some illustrated features may not be required for implementation of all examples. In some examples, the method 1500 may be carried out by the BS 1300 illustrated in FIG. 13. In some examples, the method 1500 may be carried out by any suitable apparatus or means for carrying out the functions or algorithm described below.

At block 1502, a BS may determine a first cyclic shift set applied to a first set of contiguous RBs of a first RB set of the plurality of RB sets. For example, the waveform processing circuitry 1343, shown and described above in connection with FIG. 13, may select a first ramping sequence (e.g., 0, 5, 10, ... ) for the first RB set. In some examples, the determination of the first cyclic shift set may be based on $m_{RBset}=0$ for the first 12 PRBs, and $m_{RBset}=2n_{IRB}{}^{\mu}$, $6n_{IRB}{}^{\mu}$, $8\,n_{IRB}$, etc., for subsequent sets of 12 PRBs.

At block 1504, the BS may determine a second cyclic shift set applied to a second set of contiguous RBs of a second RB set of the plurality of RB sets. For example, the waveform processing circuitry 1343, shown and described above in connection with FIG. 13, may select a second ramping sequence (e.g., 0, 7, 2, ... ) for the second RB set. In some examples, the determination of the second cyclic shift set may be based on $m_{RBset}=0$ for the first 12 PRBs, and $m_{RBset}=2n_{IRB}{}^{\mu}$, $6n_{IRB}{}^{\mu}$, $8\,n_{IRB}$, etc., for subsequent sets of 12 PRBs.

At block 1506, the BS may receive the first RB set according to the first cyclic shift set. For example, the waveform processing circuitry 1343 in cooperation with the communication and processing circuitry 1341 and transceiver 1310, shown and described above in connection with FIG. 13, may receive and decode uplink control signals on the RBs of the first RB set.

At block 1508, the BS may receive the second RB set according to the second cyclic shift set. For example, the waveform processing circuitry 1343 in cooperation with the communication and processing circuitry 1341 and transceiver 1310, shown and described above in connection with FIG. 13, may receive and decode uplink control signals on the RBs of the second RB set.

Figure 16:
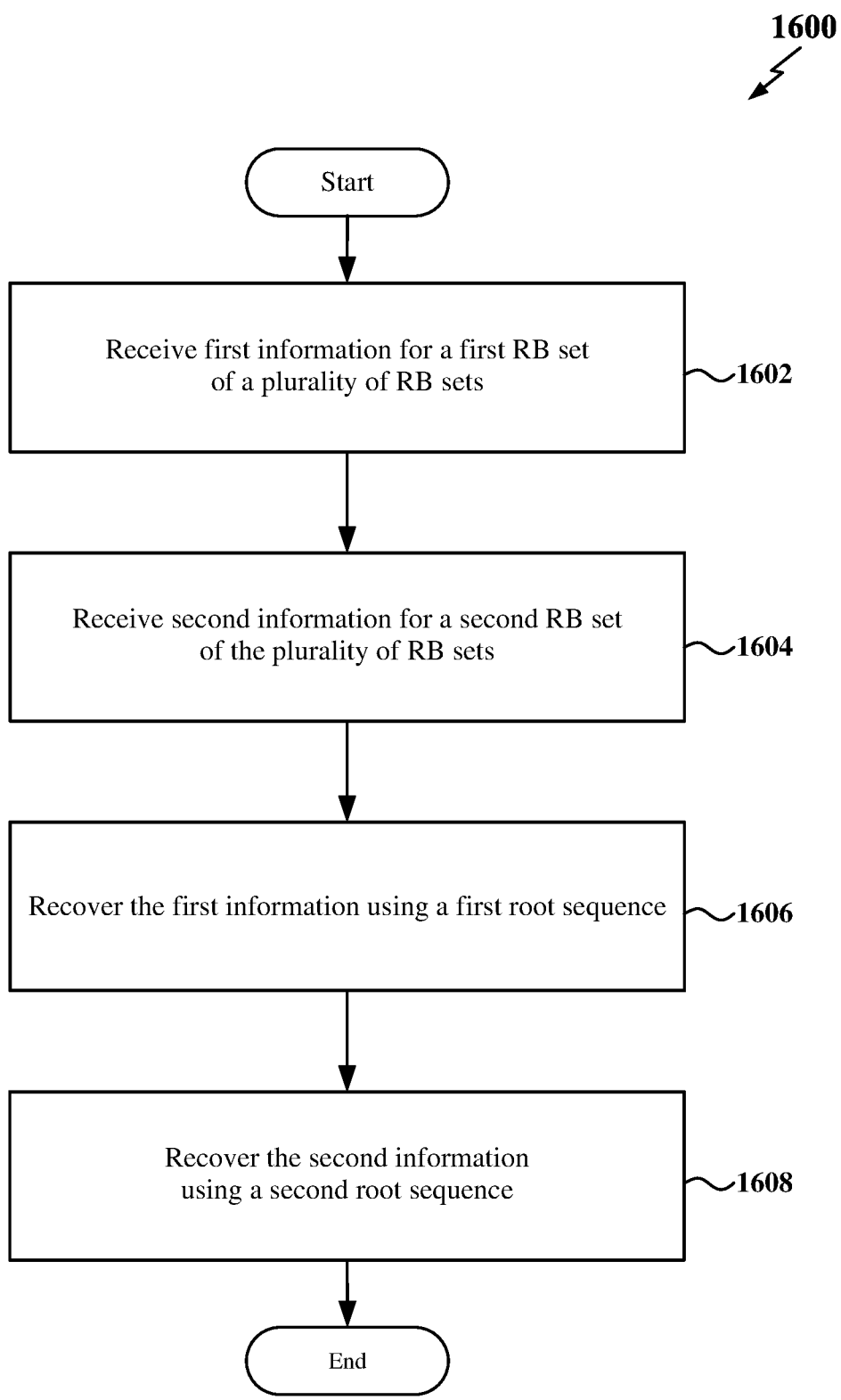
FIG. 16 is a flow chart illustrating an example method employing different root sequences according to some aspects.

FIG. 16 is a flow chart illustrating an example method 1600 for wireless communication in accordance with some aspects of the present disclosure. In some examples, one or more aspects of the method 1600 may be implemented in conjunction with (e.g., as part of and/or in addition to) the method 1400 of FIG. 14. As described below, some or all illustrated features may be omitted in a particular implementation within the scope of the present disclosure, and some illustrated features may not be required for implementation of all examples. In some examples, the method 1600 may be carried out by the BS 1300 illustrated in FIG. 13. In some examples, the method 1600 may be carried out by any suitable apparatus or means for carrying out the functions or algorithm described below.

At block 1602, a BS may receive first information for a first RB set of a plurality of RB sets. For example, the waveform processing circuitry 1343 in cooperation with the communication and processing circuitry 1341 and transceiver 1310, shown and described above in connection with FIG. 13, may monitor for signals on the RBs of the first RB set.

At block 1604, the BS may receive second information for a second RB set of the plurality of RB sets. For example, the waveform processing circuitry 1343 in cooperation with the communication and processing circuitry 1341 and transceiver 1310 may monitor for signals on the RBs of the second RB set.

At block 1606, the BS may recover the first information using a first root sequence. For example, the waveform processing circuitry 1343 may determine a root sequence based on one or more of a cell ID, a hopping ID, or time. The waveform processing circuitry 1343 may then decode these signals to recover uplink control information transmitted by a UE. In some examples, this root sequence may be a legacy root sequence (e.g., a root sequence as defined in 3GPP TS 38.211, section 5.2, December 2019).

At block 1608, the BS may recover the second information using a second root sequence. For example, the waveform processing circuitry 1343 may determine a root sequence that is different from the root sequence used at block 1606. The waveform processing circuitry 1343 may then decode these signals to recover additional uplink control information transmitted by the UE. In some examples, the waveform processing circuitry 1343 may determine this root sequence as a function of the first root sequence (e.g., $u_i=u+i\times R$ mod 30, where R is chosen as a number co-prime with 30 and i is 12 RB set index with i=0,1,2,3).

The following provides an overview of several aspects of the present disclosure.

Aspect 1: A method for wireless communication at a user equipment, the method comprising: identifying a plurality of resource block (RB) sets allocated for transmission of uplink control information, wherein each RB set of the plurality of RB sets comprises a plurality of contiguous resource blocks (RBs); determining cyclic shift ramping to be applied to successive RB sets of the plurality of RB sets; and transmitting the uplink control information via the plurality of RB sets according to the cyclic shift ramping.

Aspect 2: The method of aspect 1, wherein determining the cyclic shift ramping comprises: determining a first cyclic shift set to be applied to a first set of contiguous RBs of a first RB set of the plurality of RB sets; and determining a second cyclic shift set to be applied to a second set of contiguous RBs of a second RB set of the plurality of RB sets, wherein the second cyclic shift set is different from the first cyclic shift set.

Aspect 3: The method of aspect 2, wherein transmitting the uplink control information via the plurality of RB sets according to the cyclic shift ramping comprises: transmitting the first RB set according to the first cyclic shift set; and transmitting the second RB set according to the second cyclic shift set.

Aspect 4: The method of any of aspects 2 through 3, wherein: determining the first cyclic shift set comprises calculating a first cyclic shift value based on a first RB set index of the first RB set; and determining the second cyclic shift set comprises calculating a second cyclic shift value based on a second RB set index of the second RB set.

Aspect 5: The method of any of aspects 2 through 4, wherein a step size of the first cyclic shift set is coprime with a length of resource elements (REs) in an RB of the first RB set.

Aspect 6: The method of any of aspects 1 through 5, further comprising: generating first information for a first RB set of the plurality of RB sets using a first root sequence; and generating second information for a second RB set of the plurality of RB sets using a second root sequence, wherein the second root sequence is different from the first root sequence.

Aspect 7: The method of aspect 6, wherein: the first root sequence is based on a first index u into a table comprising a number of entries; the second root sequence is based on a second index $u_i=u+i\times R$ mod 30 into the table; i is an RB set index; and R is a number that is coprime with the number of entries of the table.

Aspect 8: The method of any of aspects 1 through 7, wherein: the cyclic shift ramping is based on a first cyclic shift ramping and a second cyclic shift ramping, and the second cyclic shift ramping is different from the first cyclic shift ramping.

Aspect 9: The method of aspect 8, wherein: the first cyclic shift ramping is based on a cyclic shift equation comprising a first cyclic shift ramping value that is based on a resource block index for each RB set; and the second cyclic shift ramping is based on the cyclic shift equation further comprising a second cyclic shift ramping value that is based on an RB set index.

Aspect 10: The method of aspect 9, wherein a sum of the first cyclic shift ramping value and the second cyclic shift ramping value for a particular RB set of the plurality of RB sets is coprime with a length of resource elements (REs) in an RB of the plurality of RB sets.

Aspect 11: The method of any of aspects 1 through 10, wherein transmitting the uplink control information via the plurality of RB sets comprises: transmitting the uplink control information via the plurality of RB sets on a shared radio frequency spectrum.

Aspect 12: The method of aspect 11, wherein the shared radio frequency spectrum comprises a millimeter wave frequency spectrum.

Aspect 13: The method of any of aspects 11 through 12, wherein the shared radio frequency spectrum comprises an unlicensed radio frequency spectrum.

Aspect 14: The method of any of aspects 1 through 13, wherein transmitting the uplink control information via the plurality of RB sets comprises: transmitting a physical uplink control channel (PUCCH) via the plurality of RB sets.

Aspect 16: A method for wireless communication at a base station, the method comprising: generating an indication of a plurality of resource block (RB) sets allocated for transmission of uplink control information, wherein each RB set of the plurality of RB sets comprises a plurality of contiguous resource blocks (RBs); transmitting the indication to a user equipment; and receiving the uplink control information from the user equipment according to cyclic shift ramping applied to successive RB sets of the plurality of RB sets.

Aspect 17: The method of aspect 16, wherein the cyclic shift ramping comprises: a first cyclic shift set applied to a first set of contiguous RBs of a first RB set of the plurality of RB sets; and a second cyclic shift set applied to a second set of contiguous RBs of a second RB set of the plurality of RB sets, wherein the second cyclic shift set is different from the first cyclic shift set.

Aspect 18: The method of aspect 17, wherein receiving the uplink control information via the plurality of RB sets according to the cyclic shift ramping comprises: receiving the first RB set according to the first cyclic shift set; and receiving the second RB set according to the second cyclic shift set.

Aspect 19: The method of any of aspects 17 through 18, wherein: the first cyclic shift set is based on a first RB set index of the first RB set; and the second cyclic shift set is based on a second RB set index of the second RB set.

Aspect 20: The method of any of aspects 17 through 19, wherein a step size of the first cyclic shift set is coprime with a length of resource elements (REs) in an RB of the first RB set.

Aspect 21: The method of any of aspects 16 through 20, wherein receiving the uplink control information comprises: receiving first information for a first RB set of the plurality of RB sets based on a first root sequence; and receiving second information for a second RB set of the plurality of RB sets based on a second root sequence, wherein the second root sequence is different from the first root sequence.

Aspect 22: The method of aspect 21, wherein: the first sequence is based on a first index u into a table comprising a number of entries; the second sequence is based on a second index $u_i=u+i\times R$ mod 30 into the table; i is an RB set index; and R is a number that is coprime with the number of entries of the table.

Aspect 23: The method of any of aspects 16 through 22, wherein: the cyclic shift ramping is based on a first cyclic shift ramping and a second cyclic shift ramping, and the second cyclic shift ramping is different from the first cyclic shift ramping.

Aspect 24: The method of aspect 23, wherein: the first cyclic shift ramping is based on a cyclic shift equation comprising a first cyclic shift ramping value that is based on a resource block index for each RB set; and the second cyclic shift ramping is based on the cyclic shift equation further comprising a second cyclic shift ramping value that is based on an RB set index.

Aspect 25: The method of aspect 24, wherein a sum of the first cyclic shift ramping value and the second cyclic shift ramping value for a particular RB set of the plurality of RB sets is coprime with a length of resource elements (REs) in an RB of the plurality of RB sets.

Aspect 26: The method of any of aspects 16 through 25, wherein receiving the uplink control information via the plurality of RB sets comprises: receiving the uplink control information via the plurality of RB sets on a shared radio frequency spectrum.

Aspect 27: The method of aspect 26, wherein the shared radio frequency spectrum comprises a millimeter wave frequency spectrum.

Aspect 28: The method of any of aspects 26 through 27, wherein the shared radio frequency spectrum comprises an unlicensed radio frequency spectrum.

Aspect 29: The method of any of aspects 16 through 28, wherein the plurality of RB sets comprises a plurality of contiguous RB sets.

Aspect 30: A user equipment (UE) comprising: a transceiver configured to communicate with a radio access network, a memory, and a processor communicatively coupled to the transceiver and the memory, wherein the processor and the memory are configured to perform any one of aspects 1 through 14.

Aspect 31: An apparatus configured for wireless communication comprising at least one means for performing any one of aspects 1 through 14.

Aspect 32: A non-transitory computer-readable medium storing computer-executable code, comprising code for causing an apparatus to perform any one of aspects 1 through 14.

Aspect 33: A base station (BS) comprising: a transceiver, a memory, and a processor communicatively coupled to the transceiver and the memory, wherein the processor and the memory are configured to perform any one of aspects 16 through 29.

Aspect 34: An apparatus configured for wireless communication comprising at least one means for performing any one of aspects 16 through 29.

Aspect 35: A non-transitory computer-readable medium storing computer-executable code, comprising code for causing an apparatus to perform any one of aspects 16 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UNITS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 9, and 11 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment, the method comprising:
    identifying a plurality of resource block (RB) sets allocated for transmission of uplink control information, wherein each RB set of the plurality of RB sets comprises a plurality of contiguous resource blocks (RBs);
    determining cyclic shift ramping to be applied to successive RB sets of the plurality of RB sets; and
    transmitting the uplink control information via the plurality of RB sets according to the cyclic shift ramping.

2. The method of claim 1, wherein determining the cyclic shift ramping comprises:
    determining a first cyclic shift set to be applied to a first set of contiguous RBs of a first RB set of the plurality of RB sets; and
    determining a second cyclic shift set to be applied to a second set of contiguous RBs of a second RB set of the plurality of RB sets, wherein the second cyclic shift set is different from the first cyclic shift set.

3. The method of claim 2, wherein transmitting the uplink control information via the plurality of RB sets according to the cyclic shift ramping comprises:
    transmitting the first RB set according to the first cyclic shift set; and
    transmitting the second RB set according to the second cyclic shift set.

4. The method of claim 2, wherein:
    determining the first cyclic shift set comprises calculating a first cyclic shift value based on a first RB set index of the first RB set; and
    determining the second cyclic shift set comprises calculating a second cyclic shift value based on a second RB set index of the second RB set.

5. The method of claim 2, wherein a step size of the first cyclic shift set is coprime with a length of resource elements (REs) in an RB of the first RB set.

6. The method of claim 1, further comprising:
    generating first information for a first RB set of the plurality of RB sets using a first root sequence; and
    generating second information for a second RB set of the plurality of RB sets using a second root sequence, wherein the second root sequence is different from the first root sequence.

7. The method of claim 6, wherein:
    the first root sequence is based on a first index u into a table comprising a number of entries;
    the second root sequence is based on a second index $u_i = u + i \times R \mod 30$ into the table;
    i is an RB set index; and
    R is a number that is coprime with the number of entries of the table.

8. The method of claim 1, wherein:
    the cyclic shift ramping is based on a first cyclic shift ramping and a second cyclic shift ramping, and
    the second cyclic shift ramping is different from the first cyclic shift ramping.

9. The method of claim 8, wherein:
    the first cyclic shift ramping is based on a cyclic shift equation comprising a first cyclic shift ramping value that is based on a resource block index for each RB set; and
    the second cyclic shift ramping is based on the cyclic shift equation further comprising a second cyclic shift ramping value that is based on an RB set index.

10. The method of claim 9, wherein a sum of the first cyclic shift ramping value and the second cyclic shift ramping value for a particular RB set of the plurality of RB sets is coprime with a length of resource elements (REs) in an RB of the plurality of RB sets.

11. The method of claim 1, wherein transmitting the uplink control information via the plurality of RB sets comprises:
    transmitting the uplink control information via the plurality of RB sets on a shared radio frequency spectrum.

12. The method of claim 11, wherein the shared radio frequency spectrum comprises a millimeter wave frequency spectrum.

13. The method of claim 11, wherein the shared radio frequency spectrum comprises an unlicensed radio frequency spectrum.

14. The method of claim 1, wherein transmitting the uplink control information via the plurality of RB sets comprises:
    transmitting a physical uplink control channel (PUCCH) via the plurality of RB sets.

15. A user equipment, comprising:
a transceiver;
a memory; and
a processor communicatively coupled to the transceiver and the memory, wherein the processor and the memory are configured to:
   identify a plurality of resource block (RB) sets allocated for transmission of uplink control information, wherein each RB set of the plurality of RB sets comprises a plurality of contiguous resource blocks (RBs);
   determine cyclic shift ramping to be applied to successive RB sets of the plurality of RB sets; and
   transmit via the transceiver the uplink control information via the plurality of RB sets according to the cyclic shift ramping.

16. A method for wireless communication at a base station, the method comprising:
generating an indication of a plurality of resource block (RB) sets allocated for transmission of uplink control information, wherein each RB set of the plurality of RB sets comprises a plurality of contiguous resource blocks (RBs);
transmitting the indication to a user equipment; and
receiving the uplink control information from the user equipment according to cyclic shift ramping applied to successive RB sets of the plurality of RB sets.

17. The method of claim 16, wherein the cyclic shift ramping comprises:
a first cyclic shift set applied to a first set of contiguous RBs of a first RB set of the plurality of RB sets; and
a second cyclic shift set applied to a second set of contiguous RBs of a second RB set of the plurality of RB sets, wherein the second cyclic shift set is different from the first cyclic shift set.

18. The method of claim 17, wherein receiving the uplink control information via the plurality of RB sets according to the cyclic shift ramping comprises:
receiving the first RB set according to the first cyclic shift set; and
receiving the second RB set according to the second cyclic shift set.

19. The method of claim 17, wherein:
the first cyclic shift set is based on a first RB set index of the first RB set; and
the second cyclic shift set is based on a second RB set index of the second RB set.

20. The method of claim 17, wherein a step size of the first cyclic shift set is coprime with a length of resource elements (REs) in an RB of the first RB set.

21. The method of claim 16, wherein receiving the uplink control information comprises:
receiving first information for a first RB set of the plurality of RB sets based on a first root sequence; and
receiving second information for a second RB set of the plurality of RB sets based on a second root sequence, wherein the second root sequence is different from the first root sequence.

22. The method of claim 21, wherein:
the first sequence is based on a first index u into a table comprising a number of entries;
the second sequence is based on a second index $u_i = u + i \times R$ mod 30 into the table;
i is an RB set index; and
R is a number that is coprime with the number of entries of the table.

23. The method of claim 16, wherein:
the cyclic shift ramping is based on a first cyclic shift ramping and a second cyclic shift ramping, and
the second cyclic shift ramping is different from the first cyclic shift ramping.

24. The method of claim 23, wherein:
the first cyclic shift ramping is based on a cyclic shift equation comprising a first cyclic shift ramping value that is based on a resource block index for each RB set; and
the second cyclic shift ramping is based on the cyclic shift equation further comprising a second cyclic shift ramping value that is based on an RB set index.

25. The method of claim 24, wherein a sum of the first cyclic shift ramping value and the second cyclic shift ramping value for a particular RB set of the plurality of RB sets is coprime with a length of resource elements (REs) in an RB of the plurality of RB sets.

26. The method of claim 16, wherein receiving the uplink control information via the plurality of RB sets comprises:
receiving the uplink control information via the plurality of RB sets on a shared radio frequency spectrum.

27. The method of claim 26, wherein the shared radio frequency spectrum comprises a millimeter wave frequency spectrum.

28. The method of claim 26, wherein the shared radio frequency spectrum comprises an unlicensed radio frequency spectrum.

29. The method of claim 16, wherein the plurality of RB sets comprises a plurality of contiguous RB sets.

30. A base station, comprising:
a transceiver;
a memory; and
a processor communicatively coupled to the transceiver and the memory, wherein the processor and the memory are configured to:
   generate an indication of a plurality of resource block (RB) sets allocated for transmission of uplink control information, wherein each RB set of the plurality of RB sets comprises a plurality of contiguous resource blocks (RBs);
   transmit the indication to a user equipment via the transceiver; and
   receive the uplink control information from the user equipment via the transceiver according to cyclic shift ramping applied to successive RB sets of the plurality of RB sets.

* * * * *